US011363663B2

(12) United States Patent
Nagaraja et al.

(10) Patent No.: US 11,363,663 B2
(45) Date of Patent: Jun. 14, 2022

(54) UPLINK BEAM, DOWNLINK BEAM, AND RADIO LINK MONITORING

(71) Applicant: QUALCOMM Incorporated, San Diego, CA (US)

(72) Inventors: Sumeeth Nagaraja, San Diego, CA (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/897,785

(22) Filed: Feb. 15, 2018

(65) Prior Publication Data

US 2018/0249526 A1  Aug. 30, 2018

Related U.S. Application Data

(60) Provisional application No. 62/463,512, filed on Feb. 24, 2017.

(51) Int. Cl.
*H04W 76/19* (2018.01)
*H04W 24/08* (2009.01)
(Continued)

(52) U.S. Cl.
CPC .......... *H04W 76/19* (2018.02); *H04B 7/0695* (2013.01); *H04B 7/088* (2013.01);
(Continued)

(58) Field of Classification Search
CPC .... H04B 17/336; H04B 7/0695; H04B 7/088; H04W 24/08; H04W 76/19
(Continued)

(56) References Cited

U.S. PATENT DOCUMENTS

2012/0281548 A1* 11/2012 Lin ................. H04W 76/18
                                                           370/242
2013/0182563 A1*  7/2013 Johansson ........... H04W 76/18
                                                           370/228
(Continued)

FOREIGN PATENT DOCUMENTS

CN       106255209 A     12/2016
EP         2868152 A1     5/2015
(Continued)

OTHER PUBLICATIONS

International Search Report and Written Opinion—PCT/US2018/018558—ISA/EPO—dated May 17, 2018.

*Primary Examiner* — Kibrom T Hailu
*Assistant Examiner* — Nizam U Ahmed
(74) *Attorney, Agent, or Firm* — Qualcomm Incorporated

(57) ABSTRACT

A base station may transmit, to a user equipment (UE), an indication of parameters (e.g., thresholds) for radio link monitoring (RLM). The UE may monitor active beam pairs in accordance with the indication. In some cases, the UE may configure or may be configured (e.g., by a base station) to transmit reference signals for triggering an RLM operation based on the monitored beam pairs. After triggering, the base station may perform an RLM operation with the UE. Additionally or alternatively, a base station may configure a UE with a beam monitoring configuration that enables uplink beam monitoring. The configuration may indicate one or more active beam pairs for uplink transmissions from the UE, and the base station may perform an RLM operation on the indicated beam pairs. Based on RLM operations (e.g., joint uplink and downlink beam monitoring), beam pairs may be reestablished or newly established.

32 Claims, 17 Drawing Sheets

(51) Int. Cl.
  *H04B 17/336* (2015.01)
  *H04L 5/00* (2006.01)
  *H04B 7/08* (2006.01)
  *H04B 7/06* (2006.01)
(52) U.S. Cl.
  CPC ......... *H04B 17/336* (2015.01); *H04L 5/0091* (2013.01); *H04W 24/08* (2013.01); *H04L 5/0048* (2013.01)
(58) Field of Classification Search
  USPC .......................................................... 370/216
  See application file for complete search history.

(56) References Cited

U.S. PATENT DOCUMENTS

| | | | |
|---|---|---|---|
| 2016/0080060 A1* | 3/2016 | Yu | ........................ H04B 7/0626 455/452.2 |
| 2016/0192376 A1 | 6/2016 | Lee et al. | |
| 2016/0278103 A1 | 9/2016 | Kazmi et al. | |
| 2016/0353510 A1 | 12/2016 | Zhang et al. | |
| 2017/0048772 A1 | 2/2017 | Gheorghiu et al. | |
| 2017/0141823 A1 | 5/2017 | Fodor et al. | |
| 2017/0170941 A1 | 6/2017 | Yang et al. | |
| 2017/0230849 A1 | 8/2017 | Wei et al. | |
| 2017/0231011 A1 | 8/2017 | Park et al. | |
| 2018/0199328 A1* | 7/2018 | Sang | ...................... H04B 7/022 |
| 2018/0212800 A1* | 7/2018 | Park | ......................... H04L 1/00 |
| 2019/0200249 A1* | 6/2019 | Yoon | .................... H04W 72/042 |
| 2019/0261287 A1* | 8/2019 | Deenoo | ................. H04W 24/08 |
| 2019/0261344 A1* | 8/2019 | Grant | ..................... H04B 7/022 |

FOREIGN PATENT DOCUMENTS

| | | |
|---|---|---|
| WO | WO-2014003499 A1 | 1/2014 |
| WO | WO-2014068535 A2 | 5/2014 |
| WO | WO-2017027055 A1 | 2/2017 |

\* cited by examiner

UPLINK BEAM, DOWNLINK BEAM, AND RADIO LINK MONITORING

CROSS REFERENCES

The present Application for Patent claims priority to U.S. Provisional Patent Application No. 62/463,512 by Nagaraja et al., entitled "Uplink Beam, Downlink Beam, and Radio Link Monitoring," filed Feb. 24, 2017, assigned to the assignee hereof, and which is hereby expressly incorporated by reference herein in its entirety.

BACKGROUND

The following relates generally to wireless communications, and more specifically to uplink beam, downlink beam, and radio link monitoring.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems (e.g., NR systems) may support beamformed transmissions and multi-beam operation for communications between wireless devices. Signal processing techniques such as beamforming may be used to combine energy coherently and overcome the path losses in systems utilizing multi-beam operation. In some cases, however, one or more active beam pairs between two wireless devices may become misaligned, which may result in beam and/or communication failure. Procedures for detecting such a misalignment may be associated with additional overhead and increased latency. Thus, improved techniques for detection and resolution of beam and/or link failure may be desired.

SUMMARY

The described techniques relate to improved methods, systems, devices, or apparatuses that support uplink beam, downlink beam, and radio link monitoring. Generally, the described techniques provide for joint monitoring of uplink beam pairs and downlink beam pairs. A base station may transmit, to a user equipment (UE), an indication of parameters (e.g., thresholds) for radio link monitoring (RLM). The UE may monitor active beam pairs in accordance with the indication. In some cases, the UE may configure or may be configured (e.g., by a base station) to transmit reference signals for triggering an RLM operation based at least in part on the monitored beam pairs. After triggering, the base station may perform an RLM operation with the UE. Additionally or alternatively, a base station may configure a UE with a beam monitoring configuration that enables uplink beam monitoring. The configuration may indicate one or more active beam pairs for uplink transmissions from the UE, and the base station may perform an RLM operation on the indicated beam pairs. Based on RLM operations (e.g., joint uplink and downlink beam monitoring), beam pairs may be reestablished or newly established.

A method of for wireless communications is described. The method may include transmitting to a UE an indication of one or more parameters for RLM, receiving, from the UE, one or more transmissions to trigger an RLM operation, and performing, based at least in part on the one or more transmissions, the RLM operation with the UE.

An apparatus for wireless communications is described. The apparatus may include means for transmitting to a UE an indication of one or more parameters for RLM, means for receiving, from the UE, one or more transmissions to trigger an RLM operation, and means for performing, based at least in part on the one or more transmissions, the RLM operation with the UE.

Another apparatus for wireless communications is described. The apparatus may include a processor, memory in electronic communication with the processor, and instructions stored in the memory. The instructions may be operable to cause the processor to transmit to a UE an indication of one or more parameters for RLM, receive, from the UE, one or more transmissions to trigger an RLM operation, and perform, based at least in part on the one or more transmissions, the RLM operation with the UE.

A non-transitory computer readable medium for wireless communications is described. The non-transitory computer-readable medium may include instructions operable to cause a processor to transmit to a UE an indication of one or more parameters for RLM, receive, from the UE, one or more transmissions to trigger an RLM operation, and perform, based at least in part on the one or more transmissions, the RLM operation with the UE.

Some examples of the method, apparatus, and non-transitory computer-readable medium described above may further include processes, features, means, or instructions for re-establishing, through the RLM operation, an active downlink (DL) beam pair with the UE, an active uplink (UL) beam pair with the UE, or both.

In some examples of the method, apparatus, and non-transitory computer-readable medium described above, receiving one or more transmissions to trigger the RLM operation comprises: receiving, from the UE, one or more reference signals (RSs), wherein the RSs may be configured, in accordance with an RLM trigger configuration, to indicate that the RLM operation may be for re-establishing an active DL beam pair with the UE. In some examples of the method, apparatus, and non-transitory computer-readable medium described above, the received one or more RSs may be synchronization signal (SS) blocks, where the SS blocks may be configured by radio resource control (RRC). In some examples of the method, apparatus, and non-transitory computer-readable medium described above, the received one or more RSs may be channel state information RSs (CSI-RSs), where the CSI-RSs may be configured by RRC.

In some examples of the method, apparatus, and non-transitory computer-readable medium described above, receiving one or more transmissions to trigger the RLM operation comprises: receiving, from the UE, one or more RSs, wherein the RSs may be configured to indicate through use of an RS sequence, an RS cyclic shift, an RS resource, or combinations thereof, that the RLM operation may be for re-establishing an active DL beam pair with the UE.

Some examples of the method, apparatus, and non-transitory computer-readable medium described above may further include processes, features, means, or instructions for transmitting an indication of a beam monitoring configuration to the UE, wherein the beam monitoring configuration indicates that the RLM operation may be able to be triggered to re-establish an active DL beam pair with the UE, an active UL beam pair with the UE, or both.

Some examples of the method, apparatus, and non-transitory computer-readable medium described above may further include processes, features, means, or instructions for configuring the UE or a group of UEs that includes the UE to periodically transmit one or more RSs in a plurality of directions for the RLM operation.

Some examples of the method, apparatus, and non-transitory computer-readable medium described above may further include processes, features, means, or instructions for exchanging with one or more base stations a RS configuration for the UE indicating a type of RS to be transmitted by the UE or the group of UEs.

Some examples of the method, apparatus, and non-transitory computer-readable medium described above may further include processes, features, means, or instructions for monitoring the one or more RSs. Some examples of the method, apparatus, and non-transitory computer-readable medium described above may further include processes, features, means, or instructions for determining, based at least in part on the monitoring, that the UE may transmit the one or more RSs in a subset of the plurality of directions for the RLM operation, the subset corresponding to active beam pairs of the UE. Some examples of the method, apparatus, and non-transitory computer-readable medium described above may further include processes, features, means, or instructions for receiving the one or more RSs on the subset of the plurality of directions for the RLM operation.

Some examples of the method, apparatus, and non-transitory computer-readable medium described above may further include processes, features, means, or instructions for comparing the one or more RSs with a threshold to determine whether to perform the RLM operation.

Some examples of the method, apparatus, and non-transitory computer-readable medium described above may further include processes, features, means, or instructions for performing, based at least in part on the comparing, additional DL beam training with the UE.

Some examples of the method, apparatus, and non-transitory computer-readable medium described above may further include processes, features, means, or instructions for requesting, of the UE, additional UL RSs in one or more requested directions.

A method of for wireless communications is described. The method may include receiving from a base station an indication of one or more parameters for RLM, monitoring one or more active beam pairs in accordance with the indication, configuring one or more transmissions to trigger an RLM operation based at least in part on the monitoring, transmitting to the base station the one or more transmissions, and performing the RLM operation with the base station.

An apparatus for wireless communications is described. The apparatus may include means for receiving from a base station an indication of one or more parameters for RLM, means for monitoring one or more active beam pairs in accordance with the indication, means for configuring one or more transmissions to trigger an RLM operation based at least in part on the monitoring, means for transmitting to the base station the one or more transmissions, and means for performing the RLM operation with the base station.

Another apparatus for wireless communications is described. The apparatus may include a processor, memory in electronic communication with the processor, and instructions stored in the memory. The instructions may be operable to cause the processor to receive from a base station an indication of one or more parameters for RLM, monitor one or more active beam pairs in accordance with the indication, configure one or more transmissions to trigger an RLM operation based at least in part on the monitoring, transmit to the base station the one or more transmissions, and perform the RLM operation with the base station.

A non-transitory computer readable medium for wireless communications is described. The non-transitory computer-readable medium may include instructions operable to cause a processor to receive from a base station an indication of one or more parameters for RLM, monitor one or more active beam pairs in accordance with the indication, configure one or more transmissions to trigger an RLM operation based at least in part on the monitoring, transmit to the base station the one or more transmissions, and perform the RLM operation with the base station.

Some examples of the method, apparatus, and non-transitory computer-readable medium described above may further include processes, features, means, or instructions for re-establishing, through the RLM operation, an active DL beam pair with the base station, an active UL beam pair with the base station, or both.

In some examples of the method, apparatus, and non-transitory computer-readable medium described above, transmitting the one or more transmissions comprises: transmitting, to the base station, one or more RSs, wherein the RSs may be configured, in accordance with an RLM trigger configuration, to indicate that the RLM operation may be for re-establishing an active DL beam pair with the base station. In some examples of the method, apparatus, and non-transitory computer-readable medium described above, the transmitted one or more RSs may be SS blocks, where the SS blocks may be configured by RRC. In some examples of the method, apparatus, and non-transitory computer-readable medium described above, the received one or more RSs may CSI-RSs, where the CSI-RSs may be configured by RRC.

In some examples of the method, apparatus, and non-transitory computer-readable medium described above, transmitting the one or more transmissions comprises: transmitting, to the base station, one or more RSs, wherein the RSs may be configured to indicate through use of an RS sequence, an RS cyclic shift, an RS resource, or combinations thereof, that the RLM operation may be for re-establishing an active DL beam pair with the base station.

Some examples of the method, apparatus, and non-transitory computer-readable medium described above may further include processes, features, means, or instructions for receiving an indication of a beam monitoring configuration from the base station, wherein the beam monitoring configuration indicates that the RLM operation may be able to be triggered to re-establish an active DL beam pair with the base station, an active UL beam pair with the base station, or both.

Some examples of the method, apparatus, and non-transitory computer-readable medium described above may further include processes, features, means, or instructions for receiving, from the base station, a configuration to periodically transmit one or more RSs in a plurality of directions for the RLM operation.

Some examples of the method, apparatus, and non-transitory computer-readable medium described above may further include processes, features, means, or instructions for receiving, from the base station, a request for additional UL RSs in one or more requested directions.

A method of for wireless communications is described. The method may include transmitting an indication of a beam monitoring configuration to a UE having one or more active beam pairs, identifying that a RLM operation is to occur in accordance with the beam monitoring configuration, and performing, based at least in part on the identifying, the RLM operation with the UE in order to establish one or more new active beam pairs with the UE. In some examples, transmitting the indication of parameters for RLM may include transmitting the indication of the beam monitoring configuration to the UE having one or more active beam pairs.

An apparatus for wireless communications is described. The apparatus may include means for transmitting an indication of a beam monitoring configuration to a UE having one or more active beam pairs, means for identifying that a RLM operation is to occur in accordance with the beam monitoring configuration, and means for performing, based at least in part on the identifying, the RLM operation with the UE in order to establish one or more new active beam pairs with the UE. In some examples, transmitting the indication of parameters for RLM may include transmitting the indication of the beam monitoring configuration to the UE having one or more active beam pairs.

Another apparatus for wireless communications is described. The apparatus may include a processor, memory in electronic communication with the processor, and instructions stored in the memory. The instructions may be operable to cause the processor to transmit an indication of a beam monitoring configuration to a UE having one or more active beam pairs, identify that a RLM operation is to occur in accordance with the beam monitoring configuration, and perform, based at least in part on the identifying, the RLM operation with the UE in order to establish one or more new active beam pairs with the UE. In some examples, transmitting the indication of parameters for RLM may include transmitting the indication of the beam monitoring configuration to the UE having one or more active beam pairs.

A non-transitory computer readable medium for wireless communications is described. The non-transitory computer-readable medium may include instructions operable to cause a processor to transmit an indication of a beam monitoring configuration to a UE having one or more active beam pairs, identify that a RLM operation is to occur in accordance with the beam monitoring configuration, and perform, based at least in part on the identifying, the RLM operation with the UE in order to establish one or more new active beam pairs with the UE. In some examples, transmitting the indication of parameters for RLM may include transmitting the indication of the beam monitoring configuration to the UE having one or more active beam pairs.

In some examples of the method, apparatus, and non-transitory computer-readable medium described above, the beam monitoring configuration indicates one or both of an UL monitoring type or a DL monitoring type.

Some examples of the method, apparatus, and non-transitory computer-readable medium described above may further include processes, features, means, or instructions for performing the RLM operation with the UE based at least in part on the radio link status message in order to establish one or more new UL active beam pairs with the UE.

In some examples of the method, apparatus, and non-transitory computer-readable medium described above, identifying that the RLM operation may occur comprises: determining a lack of radio frequency calibration or a DL/UL imbalance.

Some examples of the method, apparatus, and non-transitory computer-readable medium described above may further include processes, features, means, or instructions for transmitting an indication of the beam monitoring configuration to one or more base stations.

Some examples of the method, apparatus, and non-transitory computer-readable medium described above may further include processes, features, means, or instructions for monitoring one or more UL RSs from the UE based at least in part on the beam monitoring configuration. Some examples of the method, apparatus, and non-transitory computer-readable medium described above may further include processes, features, means, or instructions for determining, based at least in part on the monitoring, a set of RS beams for an UL-based RLM operation. Some examples of the method, apparatus, and non-transitory computer-readable medium described above may further include processes, features, means, or instructions for transmitting an indication to the UE of the set of RS beams to be used for the UL-based RLM operation.

Some examples of the method, apparatus, and non-transitory computer-readable medium described above may further include processes, features, means, or instructions for monitoring one or more UL RSs from the UE based at least in part on the beam monitoring configuration. Some examples of the method, apparatus, and non-transitory computer-readable medium described above may further include processes, features, means, or instructions for performing a DL-based RLM operation based at least in part on the monitoring.

Some examples of the method, apparatus, and non-transitory computer-readable medium described above may further include processes, features, means, or instructions for monitoring one or more UL RSs from the UE based at least in part on the beam monitoring configuration. Some examples of the method, apparatus, and non-transitory computer-readable medium described above may further include processes, features, means, or instructions for transmitting a request for one or more additional UL RSs based at least in part on the monitoring.

DETAILED DESCRIPTION

Some wireless communications systems may support beamformed transmissions and multi-beam operation between wireless devices. One example includes communications in millimeter wave (mmW) frequency bands. Communications in mmW frequency bands may experience increased signal attenuation (e.g., path loss). As a result, signal processing techniques such as beamforming may be used to combine energy coherently and overcome the path losses in these systems. In systems supporting multi-beam operation, wireless devices, such as a user equipment (UE) and base station, may be able to communicate over one or more active beam pairs. An active beam pair may correspond to a transmit beam used at the transmitting device and a receive beam at a receiving device (e.g., a beam pair). In some cases, the active beam pair(s) may become misaligned (e.g., due to beam switch failure or signal blockage) such that the UE and base station may not be able to communicate over one or more beam pairs. A UE and/or a base station may accordingly detect a beam failure (e.g., by monitoring a subset of reference signals) on the active beams used to communicate with the base station.

In some examples, wireless devices in a wireless communications system may perform a radio link monitoring (RLM) procedure in order to establish or reestablish one or more active beam pair links. A base station may configure a UE to monitor downlink reference signals to determine a beam failure. For instance, a base station may transmit one or more parameters to the UE, which may be used as thresholds for monitoring downlink reference signals communicated over one or more active beam pair links. Additionally or alternatively, the base station may transmit a beam monitoring configuration to the UE that indicates the type of RLM to be performed (e.g., downlink or uplink monitoring, or both). In some cases, a UE may be configured to transmit one or more uplink reference signals over an active beam pair link. Using the uplink reference signals, the base station may monitor the active beam pair link and perform measurements (e.g., of the reference signals) to determine whether beam failure has occurred or may occur. Based on such techniques, the base station and UE may perform an RLM procedure in order to establish, reestablish, or recover (i.e., prevent from failing) one or more active beam pair links.

Aspects of the disclosure are initially described in the context of a wireless communications system. Examples are then provided for a process flow for beam monitoring and RLM. Aspects of the disclosure are further illustrated by and described with reference to apparatus diagrams, system diagrams, and flowcharts that relate to uplink beam, downlink beam, and radio link monitoring.

Figure 1:
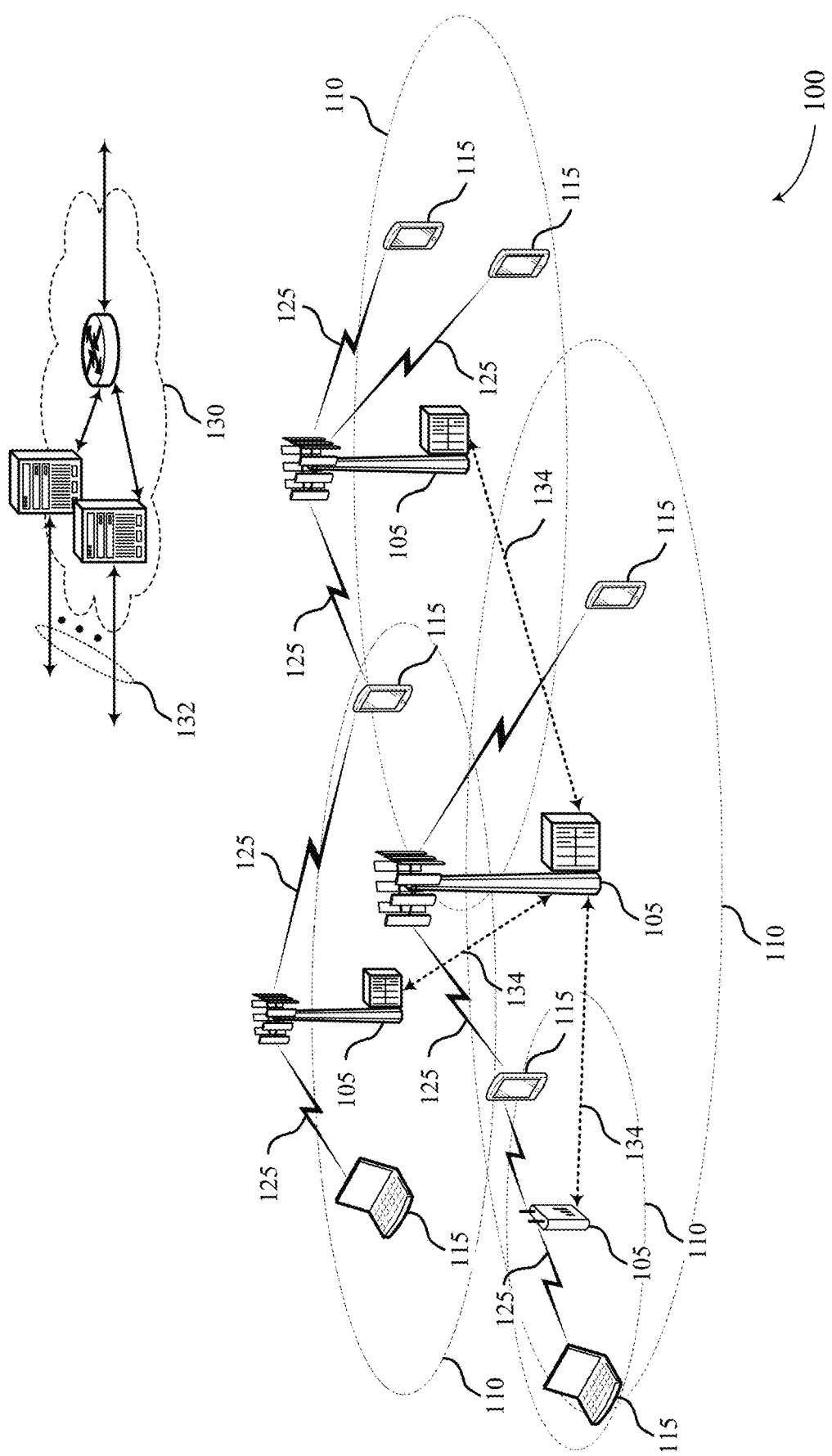
FIG. 1 illustrates an example of a wireless communications system that supports uplink beam, downlink beam, and radio link monitoring in accordance with aspects of the present disclosure.

FIG. 1 illustrates an example of a wireless communications system 100 that supports uplink beam, downlink beam, and radio link monitoring in accordance with aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support improved techniques for uplink beam, downlink beam, and radio link monitoring.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communications device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-*a* may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support multi-beam communications between UEs 115 and base stations 105. Devices operating in systems supporting multi-beam operation (e.g., mmW or EHF bands) may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 115) to shape and/or steer an overall antenna beam in the direction of a target receiver (e.g., a UE 115). This may be achieved by combining elements in an antenna array in such a way that transmitted signals at particular angles experience constructive interference while others experience destructive interference. In some cases, hybrid beamforming may refer to analog and digital beamforming techniques. Such beamforming techniques may permit multi-beam operation with one or more UEs 115 and may enhance link budget, signal-to-noise ratio (SNR), etc.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A receiver supporting multi-beam operation (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some wireless communications networks, mobile devices perform RLM to evaluate the quality of the physical link between the base stations 105 (e.g., eNBs, etc.) and the mobile devices (e.g., UE 115, etc.). If the link is degraded beyond a certain point (e.g., below a threshold), the mobile devices may be unable to successfully communicate over that link. In accordance with aspects herein, RLM may be utilized to help prevent mobile devices from continuing to transmit when the link quality has degraded to such an extent, which in turn keeps mobile devices from tying up system resources and/or causing excessive or additional interference with other devices of the wireless communications systems. In some cases, halting transmissions based on RLM may be in accordance with certain spectrum regulations (e.g., in particular frequency bands and/or regions).

RLM may be performed by UEs 115 (e.g., in LTE/LTE-A or NR networks) at the PHY layer. For example, the PHY layer may monitor downlink radio link quality of a serving or primary cell (PCell) for the purpose of indicating out-of-sync and/or in-sync status to higher layers of the UE. The PHY layer monitors one or more metrics of the downlink radio link quality and upon detection that the link has degraded beyond an out-of-sync threshold, the PHY layer notifies the upper layers by sending an out-of-sync (OOS) notification. If the link quality improves above an in-sync threshold, then the PHY layer may also notify the upper layers using an in-sync (IS) notification. Based on the OOS notification, the upper layers may declare radio link failure (RLF) and halt all transmissions. After RLF occurs, the UE 115 may try to reestablish a connection to the network, for example using similar procedures as may be used to establish an initial network connection. The IS threshold may be lower (more robust link conditions) than the OOS threshold. In some networks, the OOS and IS thresholds are based on the block error rate (BLER) of a control channel, such as a physical downlink control channel (PDCCH). In some cases, the OOS threshold is 10% BLER based on a 200 ms evaluation period and the IS threshold is 2% BLER based on a 100 ms evaluation period.

Base stations 105 and UEs 115 may communicate over active beam pairs (e.g., base station 105 and UE 115 beam pairs that carry data and control channels such as physical downlink shared channel (PDSCH), PDCCH, physical uplink shared channel (PUSCH), and physical uplink control channel (PUCCH)). Beam pair links may refer to a pairing of a transmit beam (e.g., from a base station) and a receive beam (e.g., at a UE), where each beam is formed by an array of antennas at the corresponding device. In other examples, the beam pair link may include a transmit beam from a UE and a receive beam at a base station. In some cases, active beam pairs may become misaligned due to beam switch failures, signal blockage, etc. In such cases, active beam pairs may be unsuitable for communications (e.g., of data or control information). In some examples, base stations 105 may configure UEs 115 to monitor downlink reference signals (RSs) for beam monitoring and RLM. The UEs 115 may measure the RS quality and detect RLF or beam failure if the quality of the received RS falls below a threshold. Further, wireless communications system 100 may support joint uplink and downlink RLM and beam monitoring. Thus, uplink and downlink RSs may be used such that base stations 105 and/or UEs 115 may determine RLF and/or beam failure. According to techniques described herein, latency arising from measurement reporting and uplink/downlink correspondence or imbalance issues may be reduced.

Figure 2:
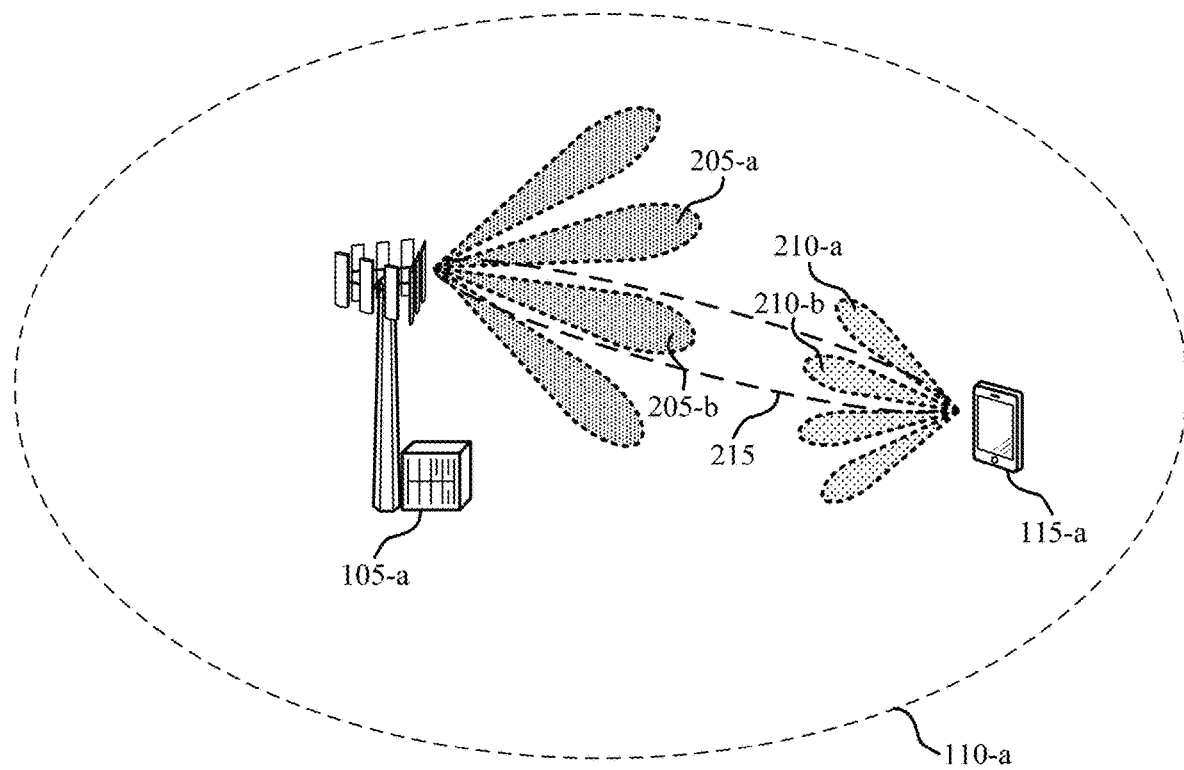
FIG. 2 illustrates an example of a wireless communications system that supports uplink beam, downlink beam, and radio link monitoring in accordance with aspects of the present disclosure.

FIG. 2 illustrates an example of a wireless communications system 200 that supports uplink beam, downlink beam, and radio link monitoring in accordance with aspects of the present disclosure. Wireless communications system 200 includes a base station 105-a and a UE 115-a, each of which may be an example of the corresponding devices as described with reference to FIG. 1.

Wireless communications system 200 may support beamformed transmissions between base station 105-a and UE 115-a. For example, wireless communications system 200 may operate using multiple communication beams (e.g., in mmW frequency ranges). As a result, signal processing techniques, such as beamforming may be used to combine energy coherently and, for example, overcome path losses. By way of example, base station 105-a may contain multiple antennas. In some cases, each antenna may transmit (or receive) a phase-shifted version of a signal such that the phase-shifted versions constructively interfere in certain regions and destructively interfere in others. Weights may be applied to the various phase-shifted versions, e.g., in order to steer the transmissions in a desired direction. Such techniques (or similar techniques) may serve to increase the coverage area 110-a of the base station 105-a or otherwise benefit wireless communications system 200.

Base station 105 may include beams 205 for communication and UE 115 may also include beams 210 for communication, which represent examples of beams over which data (or control information) may be transmitted or received according to beamforming techniques described herein. Accordingly, each beam 205 may be directed from base station 105-a toward a different region of the coverage area 110-a and in some cases, two or more beams may overlap. Beams 205-a and 205-b may be transmitted simultaneously or at different times. In either case, a UE 115-a may be capable of receiving the information in one or more beams 205 via respective beams 210 (e.g., UE 115-a may receive information transmitted using beams 205-a and 205-b via respective beams 210-a and 210-b).

In one example, UE 115-a may form one or more beams 210 (e.g., beams 210-a and 210-b). Similar to base station 105-a, UE 115-a may include multiple antennas. The beams 210-a and 210-b may each receive transmissions from one of the beams 205-a and 205-b (e.g., UE 115-a may be positioned within wireless communications system 200 such that it receives both beamformed beams 205-a and 205-b). Such a scheme may be referred to as a receive-diversity scheme. In some cases, the beams 210 may receive a single beam 205-a (e.g., beam 210-a may receive the beam 205-a with various pathloss and multipath effects included).

A beam 205 and a corresponding beam 210 may be referred to as a beam pair 215 (e.g., beam 205-b and beam 210-b may constitute a beam pair 215) or a beam pair link. The beam pair 215 may be established during cell acquisition (e.g., through synchronization signals) or through a beam refinement procedure where the UE 115-a and base station 105-a try various combinations of finer transmission beams and reception beams until a suitable beam pair 215 is determined. A beam pair 215 may be established for one or both of downlink and uplink communications. That is, a given beam pair 215 may be used for uplink-only, downlink-only, or both uplink and downlink communications between base station 105-a and UE 115-a. In some cases, each beam pair 215 may be associated with a signal quality (e.g., such that UE 115-a and base station 105-a may preferentially communicate over a beam pair with a better signal quality) and each beam pair 215 may carry one or more channels. Examples of such channels include the PDSCH, the PDCCH, the PUSCH, and the PUCCH.

In multi-beam operation, one or more active beam pairs 215 may become misaligned (e.g., which may be referred to herein as a beam failure). This misalignment may be the result of beam switch failure, signal blockage, etc. In such a scenario, base station 105- a and UE 115-a may not be able to communicate (e.g., data or control information) over the misaligned beams (e.g., in the case of beam pair 215 failure, beams 205-b and 210-b may be misaligned, or otherwise unsuitable for communication of control or data). In some cases, base station 105-a may configure a beam monitoring (e.g., active beam specific) and/or RLM (e.g., over all beams) to be downlink based (e.g., performed by UE 115-a on beams 205), uplink based (e.g., performed by base station 105-a on beams 210), or a combination of both.

In some cases, base station 105-a may configure downlink based beam monitoring and/or RLM. Base station 105-a may configure UE 115-a to monitor RSs on the downlink, such that the UE 115-a measures the RS quality and detects beam failure or link failure if the RS quality is below a threshold. That is, UE 115-a may detect the beam failure by monitoring a subset of reference signals, reference beams (e.g., beams 205), or other signals. RSs may include a synchronization signal (e.g., a primary synchronization signal (PSS) or a secondary synchronization signal (SSS)) and one or more other signals (e.g., a mobility reference signal (MRS), a channel state information reference signal (CSI-RS), etc.). In some cases, upon detection of a downlink beam failure (e.g., which may also be referred to as a link failure or RLF), UE 115-a may implicitly or explicitly indicate such a failure, as described herein, to base station 105-a. In some cases, UE 115-a or base station 105-a may be configured to support a maximum or predetermined number of reference signals for RLM. For example, UE 115-a may be configured to support up to eight CSI-RSs and/or synchronization signal (SS) blocks. Such CSI-RSs may be explicitly configured as RLM RSs via RRC signaling. When SS blocks are used, the SS blocks may be configured via RRC.

In other cases, base station 105-a may configure uplink based beam monitoring and/or RLM. For example, uplink based beam monitoring may be configured in scenarios where beam correspondence (e.g., between an uplink beam pair and a downlink beam pair) and/or beam imbalance issues are detected. Such issues may be detected, for example, via an explicit notification from UE 115-a, when the base station 105-a is not radio frequency (RF) calibrated, when blocking issues cause downlink/uplink imbalance, etc. Base station 105-a may configure UE 115-a or a group of UEs 115 to periodically send an RS or other signal in one or multiple directions (e.g., via one or more beams 210) towards base station 105-a and/or other base stations 105 (e.g., for RLM operation). The configuration of the UE 115-a may be indicated via configuration information (e.g., from the base station 105-a), which may include information related to the beams 210 to be used for uplink RSs, desired type of RS, desired density of RS, etc. Using uplink measurements of the RSs, base station 105-a may determine a subset of the RS beam set (e.g., a reference beam set) that is representative of active beams. The reference beam set may then be used for uplink link or uplink beam monitoring. UE 115-a may subsequently sweep directions indicated in the reference beam set. That is, base station 105-a may request UE 115-a transmit RSs in one or more specific directions. For example base station 105-a may indicate a beam direction in terms of one or more downlink beam identifiers (IDs) or reference signals and in some cases, UE 115-a may use a beam 210 for transmission that is the same as the beam used to receive the downlink beam ID.

The base station 105-a may further exchange RS configuration information with other nearby base stations 105 (e.g., indicating a type of RS to be transmitted by the UEs 115), such that the other nearby base stations 105 may monitor the uplink RSs from the UEs 115. Base station 105-a (or other configured nearby base stations 105) may measure the uplink RSs (e.g., all or part of the reference beam set) sent by the one or more UEs 115. If the signal quality of the RSs falls below a threshold, the base station may send additional training on the downlink and/or request additional uplink RSs in specific directions (e.g., via one or more beams 210).

In some cases (e.g., scenarios where UE 115-*a* does not have beam correspondence due to hardware limitations, maximum power exposure limits, etc.), beam pairs 215 for downlink and uplink may be different. For example, a beam pair 215 used for uplink communications may be different than a beam pair 215 used for downlink communications. The UE 115-*a* may monitor downlink RSs (e.g., based on thresholds/parameters received in an indication message from base station 105-*a*), and determine whether or not to trigger RLM at base station 105-*a*. In some cases, base station 105-*a* may explicitly trigger RLM. In other cases, UE 115-*a* may signal a different or modified RS transmission (e.g., with modified sequence, cyclic shift, resources, etc.) such that base station 105-*a* may be able to determine downlink issues experienced at UE 115-*a*. In yet other examples, UE 115-*a* may signal a different or modified RS transmission (e.g., with modified sequence, cyclic shift, resources, etc.) such that base station 105-*a* may be able to determine link improvements (e.g., downlink quality improvements) experienced at UE 115-*a*.

Figure 3:
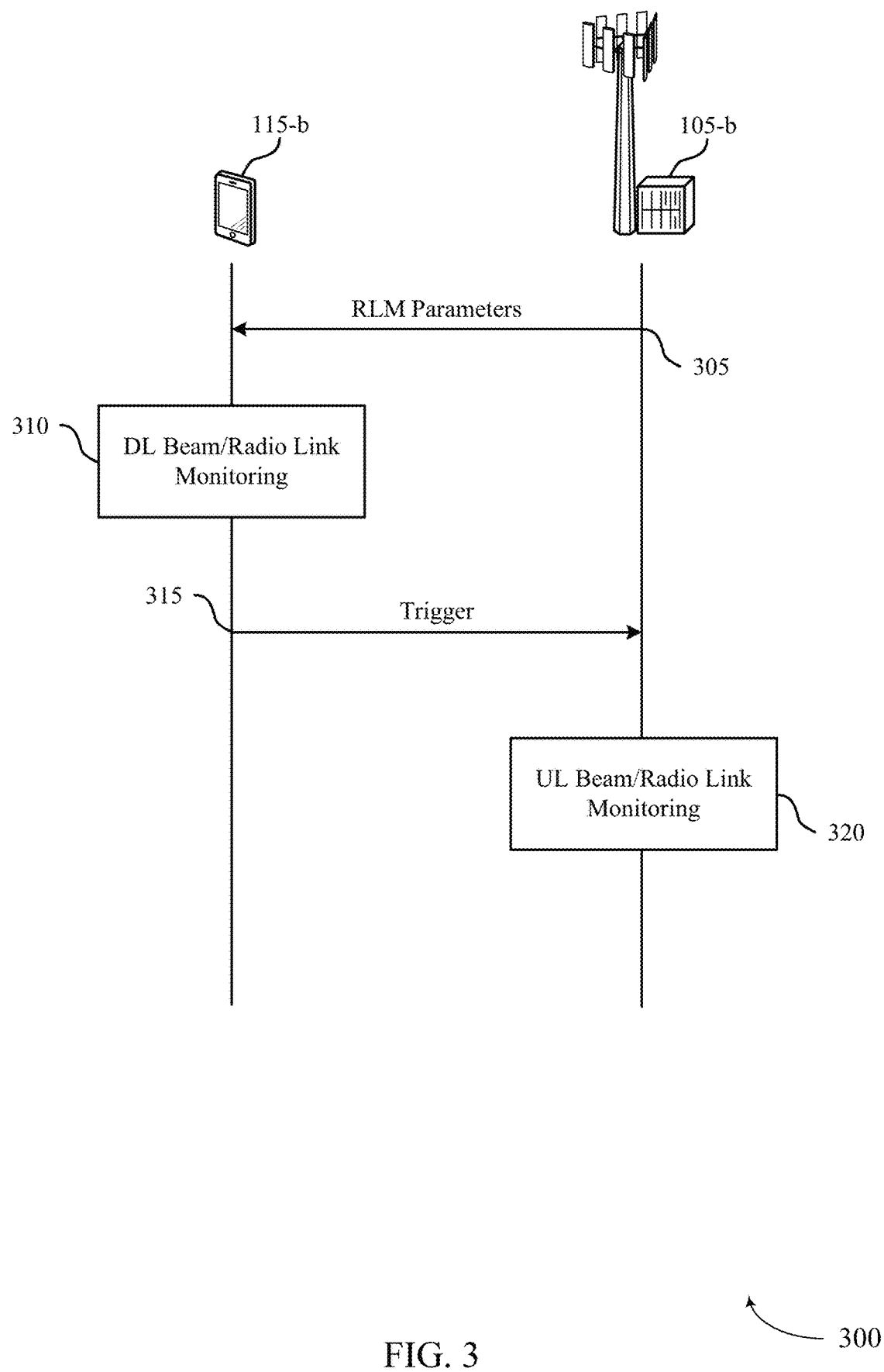
FIGS. 3 and 4 illustrate examples of process flows that support uplink beam, downlink beam, and radio link monitoring in accordance with aspects of the present disclosure.

FIG. 3 illustrates an example of a process flow 300 that supports uplink beam, downlink beam, and radio link monitoring in accordance with aspects of the present disclosure.

At step 305, base station 105-*b* may transmit an indication of RLM parameters (e.g., thresholds (e.g., Qin or Qout), beam IDs, beam pair links) to UE 115-*b*. The RLM parameters transmitted to UE 115-*b* represent various parameters that UE 115-*b* may us to perform RLM and ultimately trigger RLM at the base station 105-*b* .

At step 310, UE 115-*b* may perform an RLM operation (e.g., downlink beam monitoring). For example, UE 115-*b* may determine that a quality of a transmission over one or more downlink beams does not satisfy a threshold (e.g., indicated by parameters received at step 305). That is, UE 115-*c* may monitor one or more active beam pairs based on the indication received at step 305.

At step 315, base station 105-*b* may receive one or more transmissions (e.g., RSs) from UE 115-*b* to trigger RLM operation. The RSs may be configured (e.g., preconfigured by UE 115-*b*, in accordance with an RLM trigger configuration that may, in one example, have been previously received from base station 105-*b*, etc.) to indicate that the RLM operation is for re-establishing an active downlink beam pair with the UE 115-*b*. In some examples, the received one or more RSs may be SS blocks, where the SS blocks may be configured by RRC. In some examples, the received one or more RSs may be CSI-RSs, where the CSI-RSs may be configured by RRC. In an example, the RSs may be configured to include or use a specific sequence, cyclic shift, or resource that may be recognized by the base station 105-*b* and trigger RLM at the base station 105-*b*. If the downlink quality improves), UE 115-*b* may indicate the downlink link improvements via a RS with a specific sequence, cyclic shift, or resource, such that the RS stops RLM (e.g., de-triggers uplink RLM).

At step 320, base station 105-*b* may perform an RLM operation (e.g., uplink beam monitoring). The RLM operation may include establishing, recovering, or re-establishing an active downlink beam pair, and active uplink beam pair, or both, with UE 115-*b*.

Figure 4:
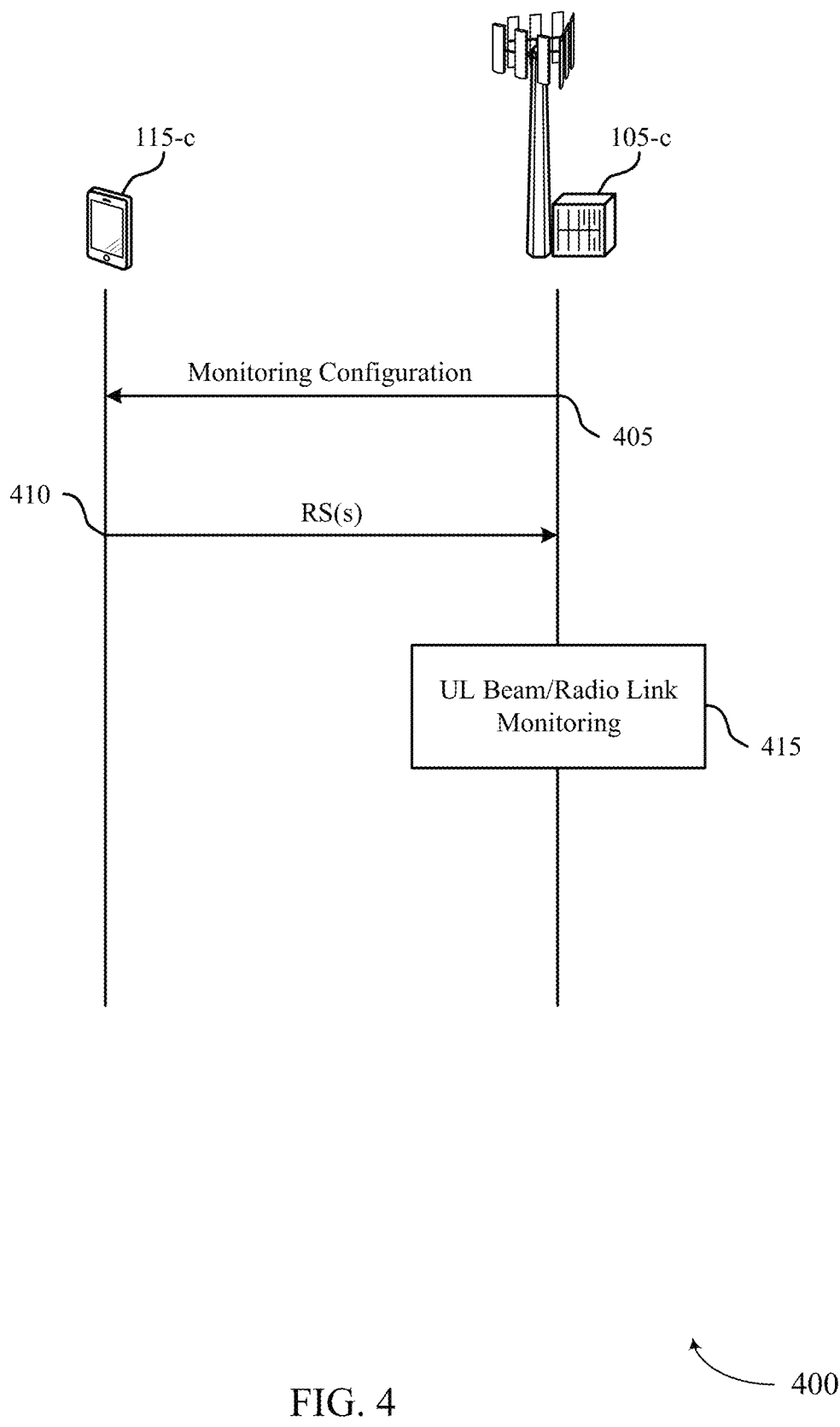

FIG. 4 illustrates an example of a process flow 400 that supports uplink beam, downlink beam, and radio link monitoring in accordance with aspects of the present disclosure.

At step 405, base station 105-*c* may transmit an indication of a beam monitoring configuration to UE 115-*b*. The beam monitoring configuration may indicate that an RLM operation is able to be triggered to re-establish an active downlink beam pair, an active uplink beam pair, or both, with UE 115-*c*. That is, the beam monitoring configuration may indicate one or both of an uplink monitoring type or a downlink monitoring type. The indication may configure UE 115-*c*, and in some cases other UEs 115, to periodically transmit one or more RSs in multiple directions for the RLM operation to be performed at step 415. In some cases, base station 105-*c* may additionally exchange, with other base stations 105, a RS configuration for the UE 115-*c* indicating a type of RS to be transmitted by the UE 115-*c*. Additionally, the configuration may indicate one or more beam directions for uplink RSs.

At step 410, UE 115-*c* may transmit one or more RSs according to the configuration information received at step 405. The base station 105-*c* may monitor for the RSs and determine, based on the monitoring, that the UE 115-*c* is to transmit the one or more RSs in a subset of the plurality of directions for the RLM operation, the subset corresponding to active beam pairs of the UE 115-*c*. Further, the base station may then receive the one or more RSs on the subset of the plurality of directions. In some cases, base station 105-*c* may compare the received RSs to a threshold to determine whether or not to perform an RLM operation. Additionally, base station 105-*c* may perform additional downlink beam training with UE 115-*c* based on the comparison of the RSs to the threshold. In some cases, base station 105-*c* may request additional uplink RSs in one or more specified directions. In some cases, in addition to the RSs, UE 115-*c* may transmit a radio link status message based on the configuration received at step 405.

At step 415, base station 105-*c* may perform an RLM operation (e.g., based on the received on the subset of the plurality of directions and/or the radio link status message). In some cases, the RLM operation may be performed based on determining a lack of RF calibration or a downlink/uplink imbalance.

Figure 5:
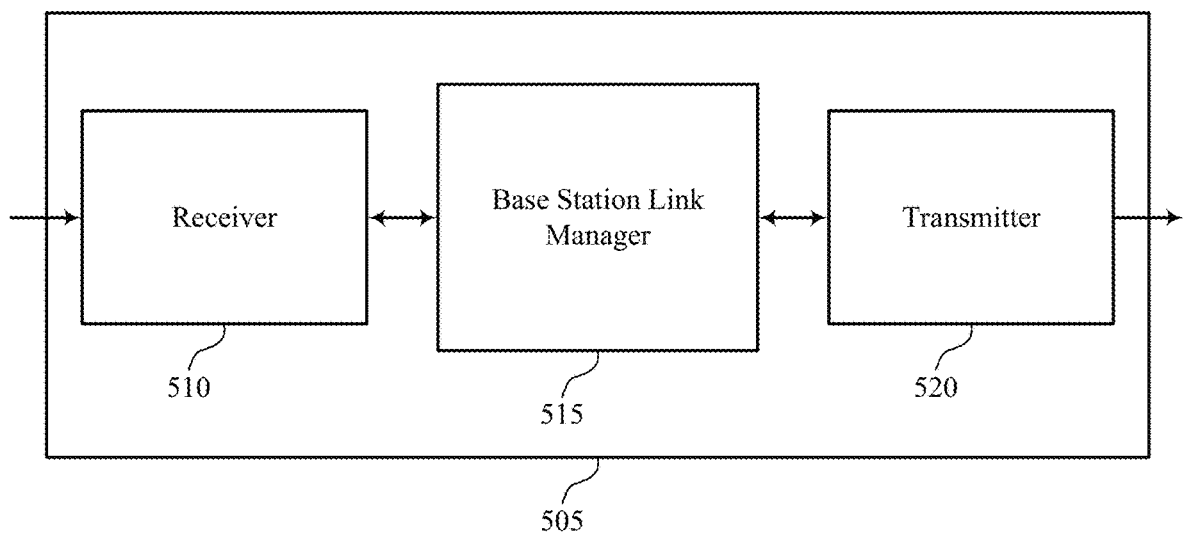
FIGS. 5 through 6 show block diagrams of wireless devices that support uplink beam, downlink beam, and radio link monitoring in accordance with aspects of the present disclosure.

FIG. 5 shows a block diagram 500 of a wireless device 505 that supports uplink beam, downlink beam, and radio link monitoring in accordance with aspects of the present disclosure. Wireless device 505 may be an example of aspects of a base station 105 as described with reference to FIG. 1. Wireless device 505 may include receiver 510, base station link manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to uplink beam, downlink beam, and radio link monitoring, etc.). Information may be passed on to other components of the device. The receiver 510 may be an example of aspects of the transceiver 835 as described with reference to FIG. 8. The receiver 510 may utilize a single antenna or a set of antennas.

Base station link manager 515 may be an example of aspects of the base station link manager 815 as described with reference to FIG. 8. Base station link manager 515 and/or at least some of its various sub-components may be implemented in hardware, software executed by a processor, firmware, or any combination thereof If implemented in software executed by a processor, the functions of the base station link manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station link manager 515 and/or at least some of its various sub-components may be physically located at various positions, including being distributed such that portions of functions are implemented at different physical locations by one or more physical devices. In some examples, base station link manager 515 and/or at least some of its various sub-components may be a separate and distinct component in accordance with aspects of the present disclosure. In other examples, base station link manager 515 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

Base station link manager 515 may transmit to a UE an indication of one or more parameters for RLM, receive, from the UE, one or more transmissions to trigger an RLM operation, and perform, based on the one or more transmissions, the RLM operation with the UE. The base station link manager 515 may also transmit an indication of a beam monitoring configuration to a UE having one or more active beam pairs, identify that a RLM operation is to occur in accordance with the beam monitoring configuration, and perform, based on the identifying, the RLM operation with the UE in order to establish one or more new active beam pairs with the UE. In some cases, transmitting an indication of parameters for RLM may include transmitting the indication of the beam monitoring configuration to the UE having one or more active beam pairs.

Transmitter 520 may transmit signals generated by other components of the device. In some examples, the transmitter 520 may be collocated with a receiver 510 in a transceiver module. For example, the transmitter 520 may be an example of aspects of the transceiver 835 as described with reference to FIG. 8. The transmitter 520 may utilize a single antenna or a set of antennas.

Figure 6:
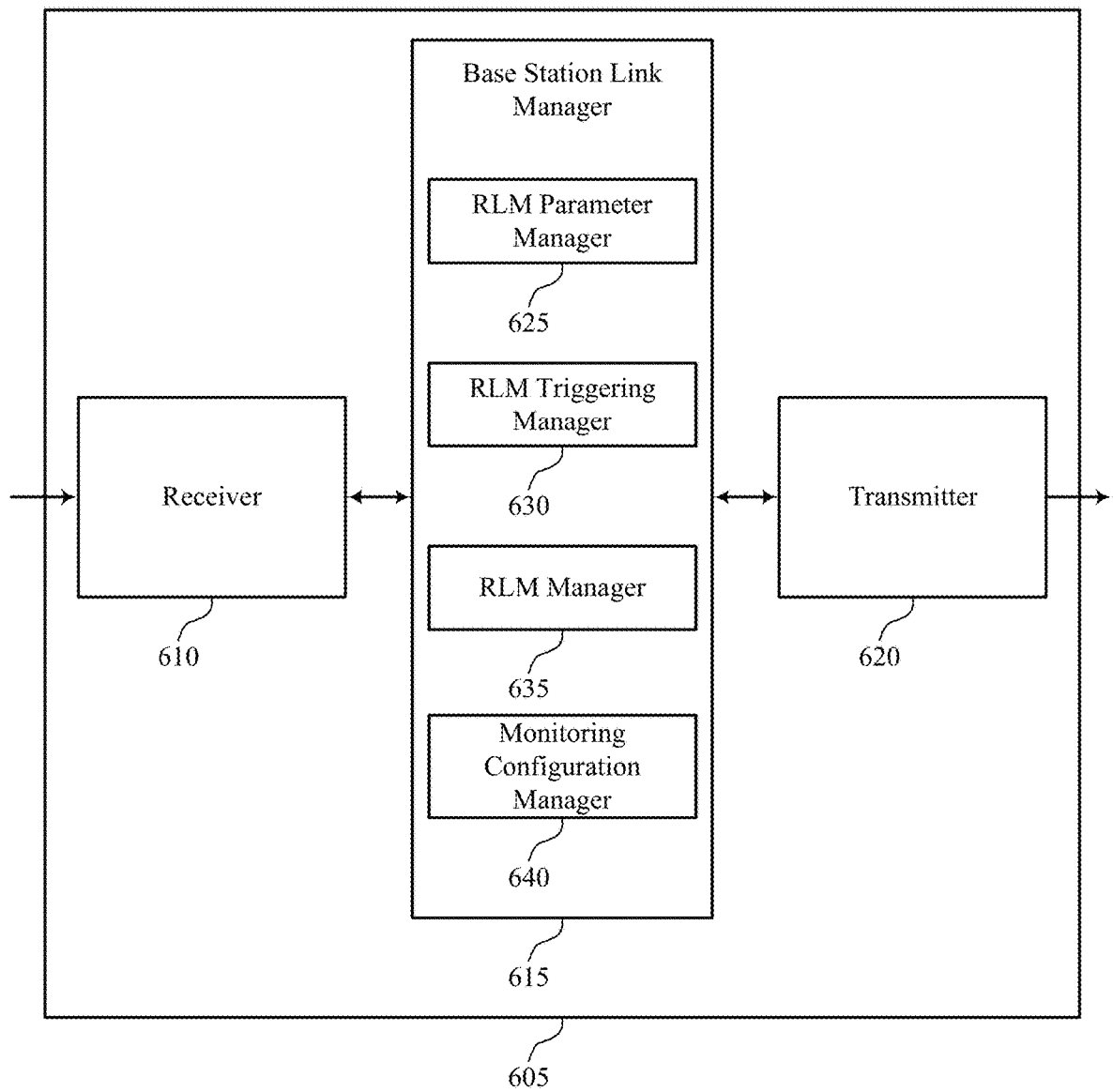

FIG. 6 shows a block diagram 600 of a wireless device 605 that supports uplink beam, downlink beam, and radio link monitoring in accordance with aspects of the present disclosure. Wireless device 605 may be an example of aspects of a wireless device 505 or a base station 105 as described with reference to FIGS. 1 and 5. Wireless device 605 may include receiver 610, base station link manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to uplink beam, downlink beam, and radio link monitoring, etc.). Information may be passed on to other components of the device. The receiver 610 may be an example of aspects of the transceiver 835 as described with reference to FIG. 8. The receiver 610 may utilize a single antenna or a set of antennas.

Base station link manager 615 may be an example of aspects of the base station link manager 815 as described with reference to FIG. 8. Base station link manager 615 may also include RLM parameter manager 625, RLM triggering manager 630, RLM manager 635, and monitoring configuration manager 640.

RLM parameter manager 625 may transmit to a UE an indication of one or more parameters for RLM. RLM triggering manager 630 may receive, from the UE, one or more transmissions to trigger an RLM operation. RLM manager 635 may perform, based on the one or more transmissions, the RLM operation with the UE. The RLM manager 635 may identify that a RLM operation is to occur in accordance with the beam monitoring configuration and perform, based on the identifying, the RLM operation with the UE in order to establish one or more new active beam pairs with the UE. Further, the RLM manager 635 may perform the RLM operation with the UE based on the radio link status message in order to establish one or more new uplink active beam pairs with the UE, and perform a downlink-based RLM operation based on the monitoring.

Monitoring configuration manager 640 may transmit an indication of a beam monitoring configuration to the UE, where the beam monitoring configuration indicates that the RLM operation is able to be triggered to re-establish an active downlink beam pair with the UE, an active uplink beam pair with the UE, or both. Monitoring configuration manager 640 may then configure the UE, or a group of UEs that includes the UE, to periodically transmit one or more RSs in a set of directions for the RLM operation and exchange with one or more base stations a RS configuration for the UE indicating a type of RS to be transmitted by the UE or the group of UEs. In some cases, the monitoring configuration manager 640 may transmit an indication of a beam monitoring configuration to a UE having one or more active beam pairs, and transmit an indication of the beam monitoring configuration to one or more base stations. In some cases, transmitting an indication of parameters for RLM may include transmitting the indication of the beam monitoring configuration to the UE having one or more active beam pairs. In some cases, the beam monitoring configuration indicates one or both of an uplink monitoring type or a downlink monitoring type.

Transmitter 620 may transmit signals generated by other components of the device. In some examples, the transmitter 620 may be collocated with a receiver 610 in a transceiver module. For example, the transmitter 620 may be an example of aspects of the transceiver 835 as described with reference to FIG. 8. The transmitter 620 may utilize a single antenna or a set of antennas.

Figure 7:
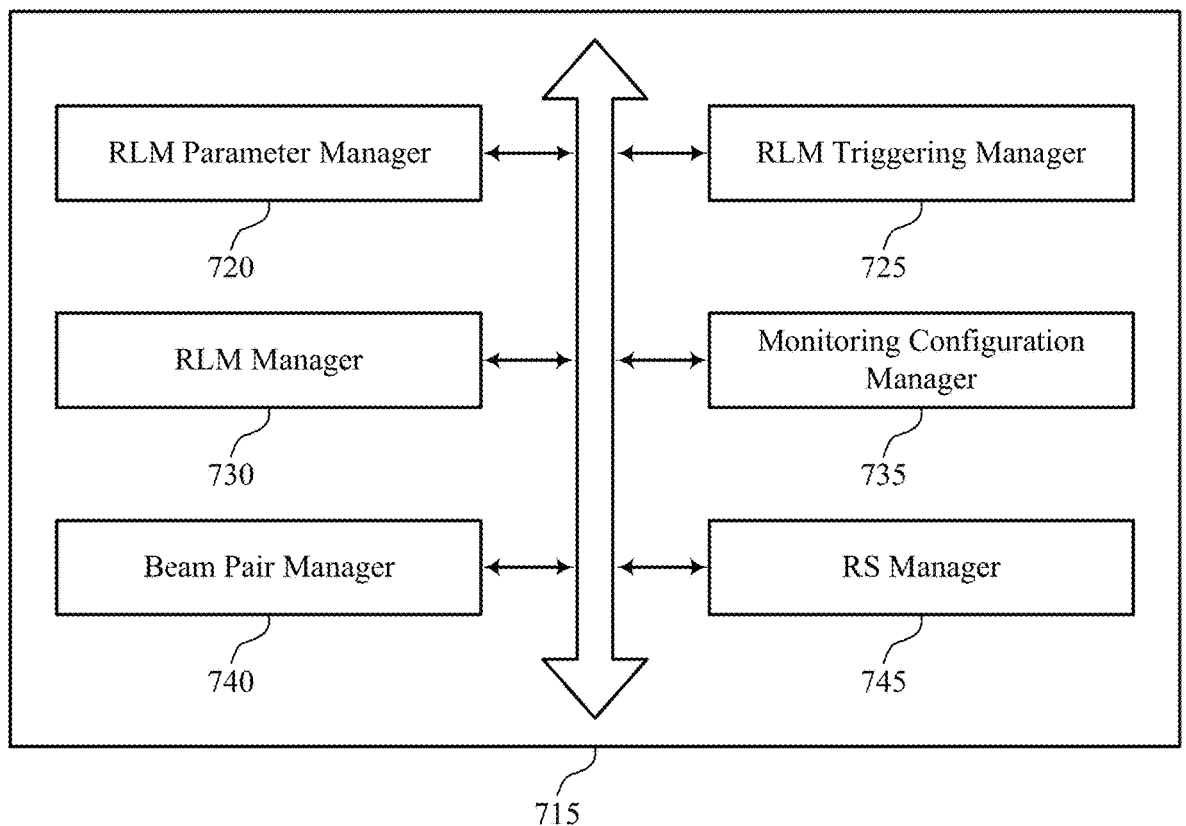
FIG. 7 shows a block diagram of a base station link manager that supports uplink beam, downlink beam, and radio link monitoring in accordance with aspects of the present disclosure.

FIG. 7 shows a block diagram 700 of a base station link manager 715 that supports uplink beam, downlink beam, and radio link monitoring in accordance with aspects of the present disclosure. The base station link manager 715 may be an example of aspects of a base station link manager 515, a base station link manager 615, or a base station link manager 815 as described with reference to FIGS. 5, 6, and 8. The base station link manager 715 may include RLM parameter manager 720, RLM triggering manager 725, RLM manager 730, monitoring configuration manager 735, beam pair manager 740, and RS manager 745. Each of these modules may communicate, directly or indirectly, with one another (e.g., via one or more buses).

RLM parameter manager 720 may transmit to a UE an indication of one or more parameters for RLM. RLM triggering manager 725 may receive, from the UE, one or more transmissions to trigger an RLM operation. RLM manager 730 may perform, based on the one or more transmissions, the RLM operation with the UE, and identify that a RLM operation is to occur in accordance with the beam monitoring configuration. RLM manager 730 may perform, based on the identifying, the RLM operation with the UE in order to establish one or more new active beam pairs with the UE and perform the RLM operation with the UE based on the radio link status message in order to establish one or more new uplink active beam pairs with the UE. RLM manager 730 may then perform a downlink-based RLM operation based on the monitoring.

Monitoring configuration manager 735 may transmit an indication of a beam monitoring configuration to the UE, where the beam monitoring configuration indicates that the RLM operation is able to be triggered to re-establish an active downlink beam pair with the UE, an active uplink beam pair with the UE, or both. The monitoring configuration manager 735 may configure the UE or a group of UEs that includes the UE to periodically transmit one or more RSs in a set of directions for the RLM operation and exchange, with one or more base stations, a RS configuration for the UE indicating a type of RS to be transmitted by the UE or the group of UEs. Monitoring configuration manager 735 may then transmit an indication of a beam monitoring configuration to a UE having one or more active beam pairs, and transmit an indication of the beam monitoring configuration to one or more base stations. In some cases, transmitting an indication of parameters for RLM may include transmitting the indication of the beam monitoring configuration to the UE having one or more active beam pairs. In some cases, the beam monitoring configuration indicates one or both of an uplink monitoring type or a downlink monitoring type.

Beam pair manager 740 may re-establish, through the RLM operation, an active downlink beam pair with the UE, an active uplink beam pair with the UE, or both and perform, based on the comparing, additional downlink beam training with the UE. In some cases, identifying that the RLM operation is to occur includes: determining a lack of radio frequency calibration or a downlink/uplink imbalance.

RS manager 745 may transmit a request for one or more additional uplink RSs based on the monitoring, monitor the one or more RSs, and determine, based on the monitoring, that the UE is to transmit the one or more RSs in a subset of the set of directions for the RLM operation. In some cases, the subset may correspond to active beam pairs of the UE. RS manager 745 may then receive the one or more RSs on the subset of the set of directions for the RLM operation and compare the one or more RSs with a threshold to determine whether to perform the RLM operation. The RS manager 745 may monitor one or more uplink RSs from the UE based on the beam monitoring configuration and determine, based on the monitoring, a set of RS beams for an uplink (UL)-based RLM operation. Additionally, RS manager 745 may transmit an indication to the UE of the set of RS beams to be used for the UL-based RLM operation, and request, of the UE, additional uplink RSs in one or more requested directions. In some cases, receiving one or more transmissions to trigger the RLM operation includes: receiving, from the UE, one or more RSs, where the RSs are configured, in accordance with an RLM trigger configuration, to indicate that the RLM operation is for re-establishing an active downlink beam pair with the UE. In some examples, the received one or more RSs may be SS blocks, where the SS blocks may be configured by RRC. In some examples, the received one or more RSs may be CSI-RSs, where the CSI-RSs may be configured by RRC. In some cases, receiving one or more transmissions to trigger the RLM operation includes: receiving, from the UE, one or more RSs, where the RSs are configured to indicate through use of an RS sequence, an RS cyclic shift, an RS resource, or combinations thereof, that the RLM operation is for re-establishing an active downlink beam pair with the UE.

Figure 8:
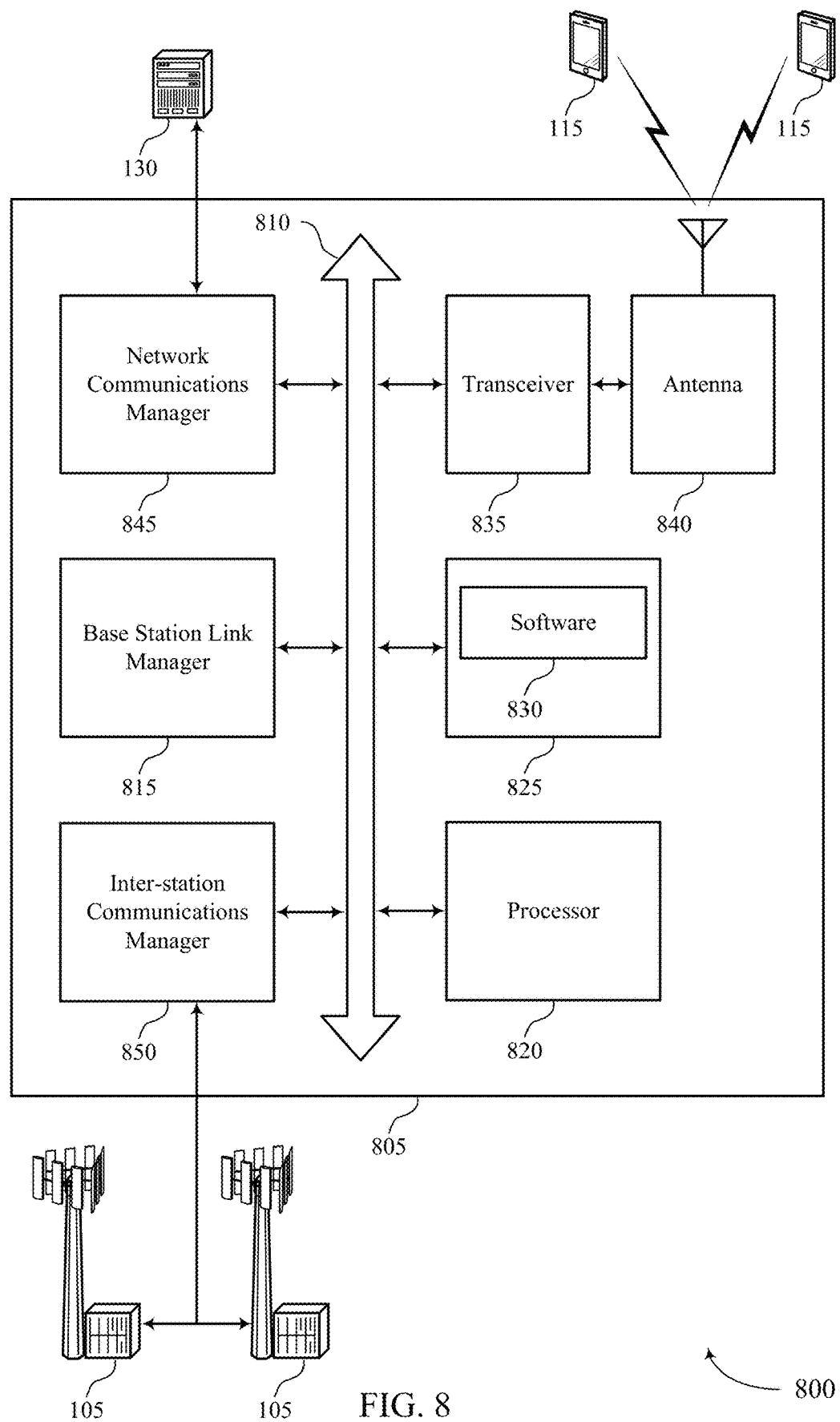
FIG. 8 illustrates a block diagram of a system including a wireless device that supports uplink beam, downlink beam, and radio link monitoring in accordance with aspects of the present disclosure.

FIG. 8 shows a diagram of a system 800 including a wireless device 805 that supports uplink beam, downlink beam, and radio link monitoring in accordance with aspects of the present disclosure. Wireless device 805 may be an example of or include the components of wireless device 505, wireless device 605, or a base station 105, for example, as described with reference to FIGS. 1, 5, and 6. Wireless device 805 may include components for bi-directional voice and data communications including components for transmitting and receiving communications, including base station link manager 815, processor 820, memory 825, software 830, transceiver 835, antenna 840, network communications manager 845, and inter-station communications manager 850. These components may be in electronic communication via one or more busses (e.g., bus 810). Wireless device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting uplink beam, downlink beam, and radio link monitoring).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support uplink beam, downlink beam, and radio link monitoring. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some examples, base station communications manager 850 may provide an X2 interface within an LTE/LTE-A wireless communications network technology to provide communication between base stations 105.

Figure 9:
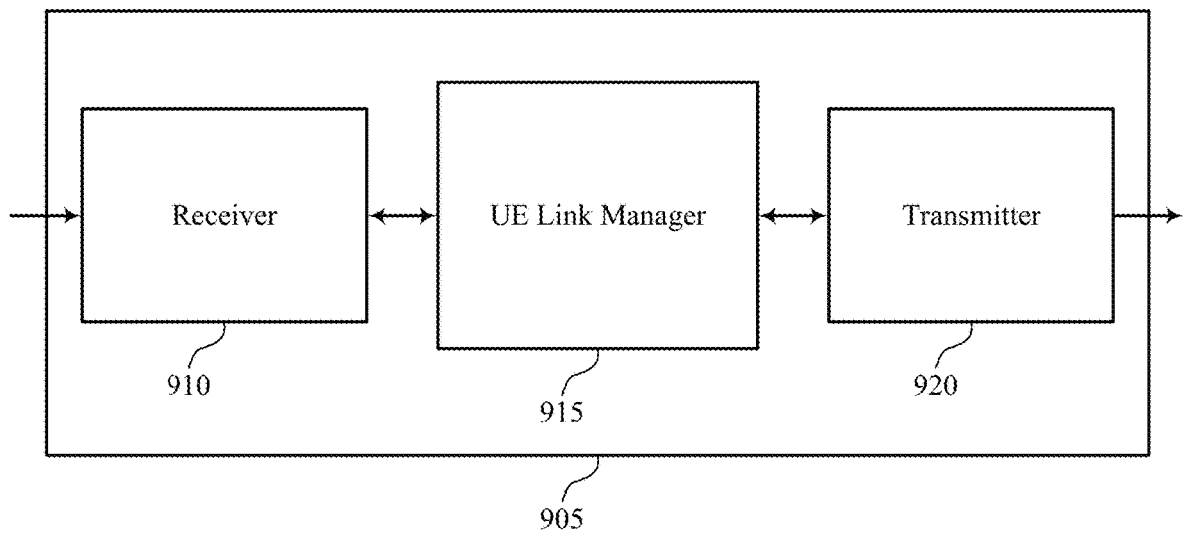
FIGS. 9 through 10 show block diagrams of wireless devices that support uplink beam, downlink beam, and radio link monitoring in accordance with aspects of the present disclosure.

FIG. 9 shows a block diagram 900 of a wireless device 905 that supports uplink beam, downlink beam, and radio link monitoring in accordance with aspects of the present disclosure. Wireless device 905 may be an example of aspects of a UE 115 as described with reference to FIG. 1. Wireless device 905 may include receiver 910, UE link manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to uplink beam, downlink beam, and radio link monitoring, etc.). Information may be passed on to other components of the device. The receiver 910 may be an example of aspects of the transceiver 1235 as described with reference to FIG. 12. The receiver 910 may utilize a single antenna or a set of antennas.

UE link manager 915 may be an example of aspects of the UE link manager 1215 as described with reference to FIG. 12. UE link manager 915 and/or at least some of its various sub-components may be implemented in hardware, software executed by a processor, firmware, or any combination thereof. If implemented in software executed by a processor, the functions of the UE link manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE link manager 915 and/or at least some of its various sub-components may be physically located at various positions, including being distributed such that portions of functions are implemented at different physical locations by one or more physical devices. In some examples, UE link manager 915 and/or at least some of its various sub-components may be a separate and distinct component in accordance with aspects of the present disclosure. In other examples, UE link manager 915 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

UE link manager 915 may receive from a base station an indication of one or more parameters for RLM, monitor one or more active beam pairs in accordance with the indication, configure one or more transmissions to trigger an RLM operation based on the monitoring, and perform the RLM operation with the base station.

Transmitter 920 may transmit signals generated by other components of the device. In some examples, the transmitter 920 may be collocated with a receiver 910 in a transceiver module. For example, the transmitter 920 may be an example of aspects of the transceiver 1235 as described with reference to FIG. 12. The transmitter 920 may utilize a single antenna or a set of antennas. Transmitter 920 may transmit to the base station the one or more transmissions.

Figure 10:
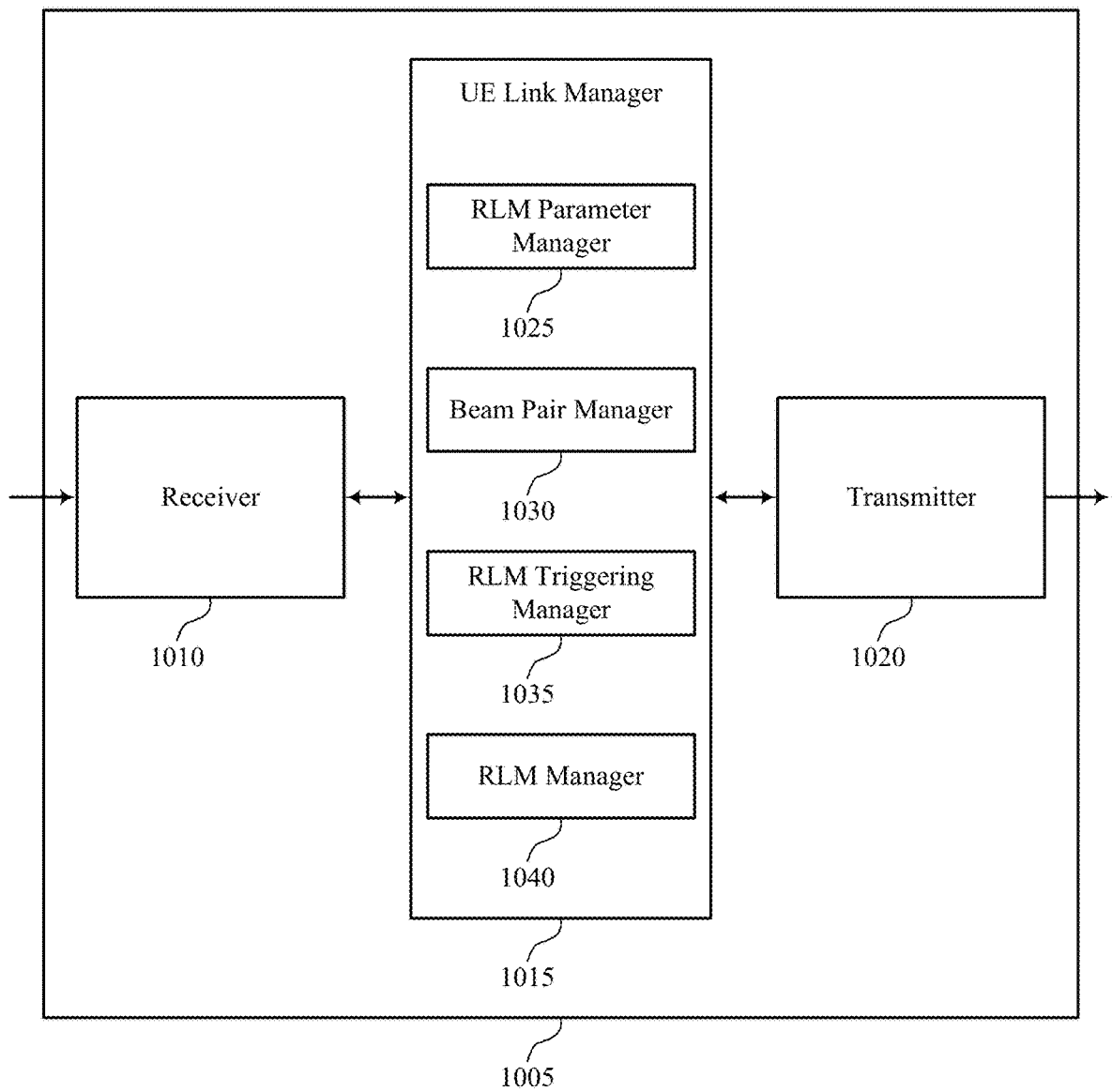

FIG. 10 shows a block diagram 1000 of a wireless device 1005 that supports uplink beam, downlink beam, and radio link monitoring in accordance with aspects of the present disclosure. Wireless device 1005 may be an example of aspects of a wireless device 905 or a UE 115 as described with reference to FIGS. 1 and 9. Wireless device 1005 may include receiver 1010, UE link manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to uplink beam, downlink beam, and radio link monitoring, etc.). Information may be passed on to other components of the device. The receiver 1010 may be an example of aspects of the transceiver 1235 as described with reference to FIG. 12. The receiver 1010 may utilize a single antenna or a set of antennas.

UE link manager 1015 may be an example of aspects of the UE link manager 1215 as described with reference to FIG. 12. UE link manager 1015 may also include RLM parameter manager 1025, beam pair manager 1030, RLM triggering manager 1035, and RLM manager 1040. RLM parameter manager 1025 may receive from a base station an indication of one or more parameters for RLM.

Beam pair manager 1030 may monitor one or more active beam pairs in accordance with the indication and re-establish, through the RLM operation, an active downlink beam pair with the base station, an active uplink beam pair with the base station, or both. RLM triggering manager 1035 may configure one or more transmissions to trigger an RLM operation based on the monitoring. RLM manager 1040 may perform the RLM operation with the base station.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 as described with reference to FIG. 12. The transmitter 1020 may utilize a single antenna or a set of antennas.

Figure 11:
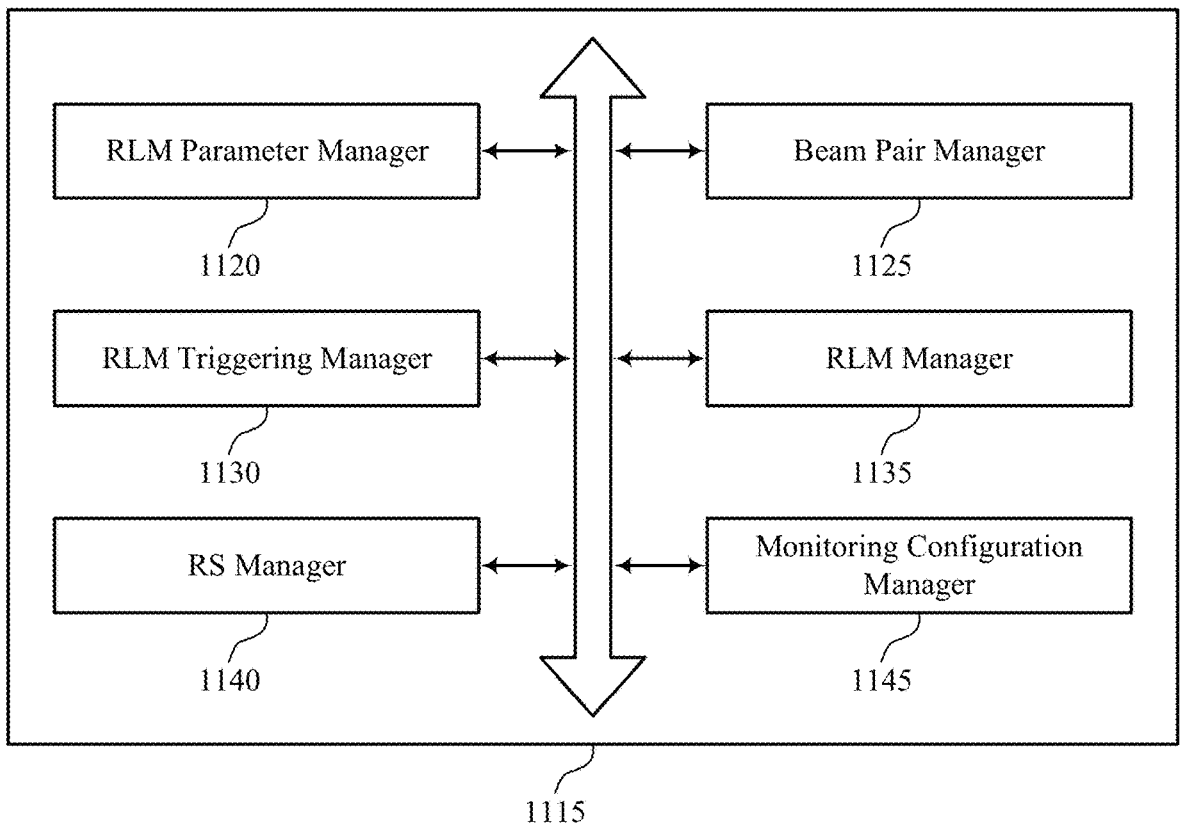
FIG. 11 shows a block diagram of a UE link manager that supports uplink beam, downlink beam, and radio link monitoring in accordance with aspects of the present disclosure.

FIG. 11 shows a block diagram 1100 of a UE link manager 1115 that supports uplink beam, downlink beam, and radio link monitoring in accordance with aspects of the present disclosure. The UE link manager 1115 may be an example of aspects of a UE link manager 1215 as described with reference to FIGS. 9, 10, and 12. The UE link manager 1115 may include RLM parameter manager 1120, beam pair manager 1125, RLM triggering manager 1130, RLM manager 1135, RS manager 1140, and monitoring configuration manager 1145. Each of these modules may communicate, directly or indirectly, with one another (e.g., via one or more buses).

RLM parameter manager 1120 may receive from a base station an indication of one or more parameters for RLM. Beam pair manager 1125 may monitor one or more active beam pairs in accordance with the indication and re-establish, through the RLM operation, an active downlink beam pair with the base station, an active uplink beam pair with the base station, or both. RLM triggering manager 1130 may configure one or more transmissions to trigger an RLM operation based on the monitoring. RLM manager 1135 may perform the RLM operation with the base station.

RS manager 1140 may receive, from the base station, a configuration to periodically transmit one or more RSs in a set of directions for the RLM operation and receive, from the base station, a request for additional uplink RSs in one or more requested directions. In some cases, transmitting the one or more transmissions includes: transmitting, to the base station, one or more RSs, where the RSs are configured, in accordance with an RLM trigger configuration, to indicate that the RLM operation is for re-establishing an active downlink beam pair with the base station. In some examples, the transmitted one or more RSs may be SS blocks, where the SS blocks may be configured by RRC. In some examples, the transmitted one or more RSs may be CSI-RSs, where the CSI-RSs may be configured by RRC. In some cases, transmitting the one or more transmissions includes: transmitting, to the base station, one or more RSs, where the RSs are configured to indicate through use of an RS sequence, an RS cyclic shift, an RS resource, or combinations thereof, that the RLM operation is for re-establishing an active downlink beam pair with the base station.

Monitoring configuration manager 1145 may receive an indication of a beam monitoring configuration from the base station, where the beam monitoring configuration indicates that the RLM operation is able to be triggered to re-establish an active downlink beam pair with the base station, an active uplink beam pair with the base station, or both.

Figure 12:
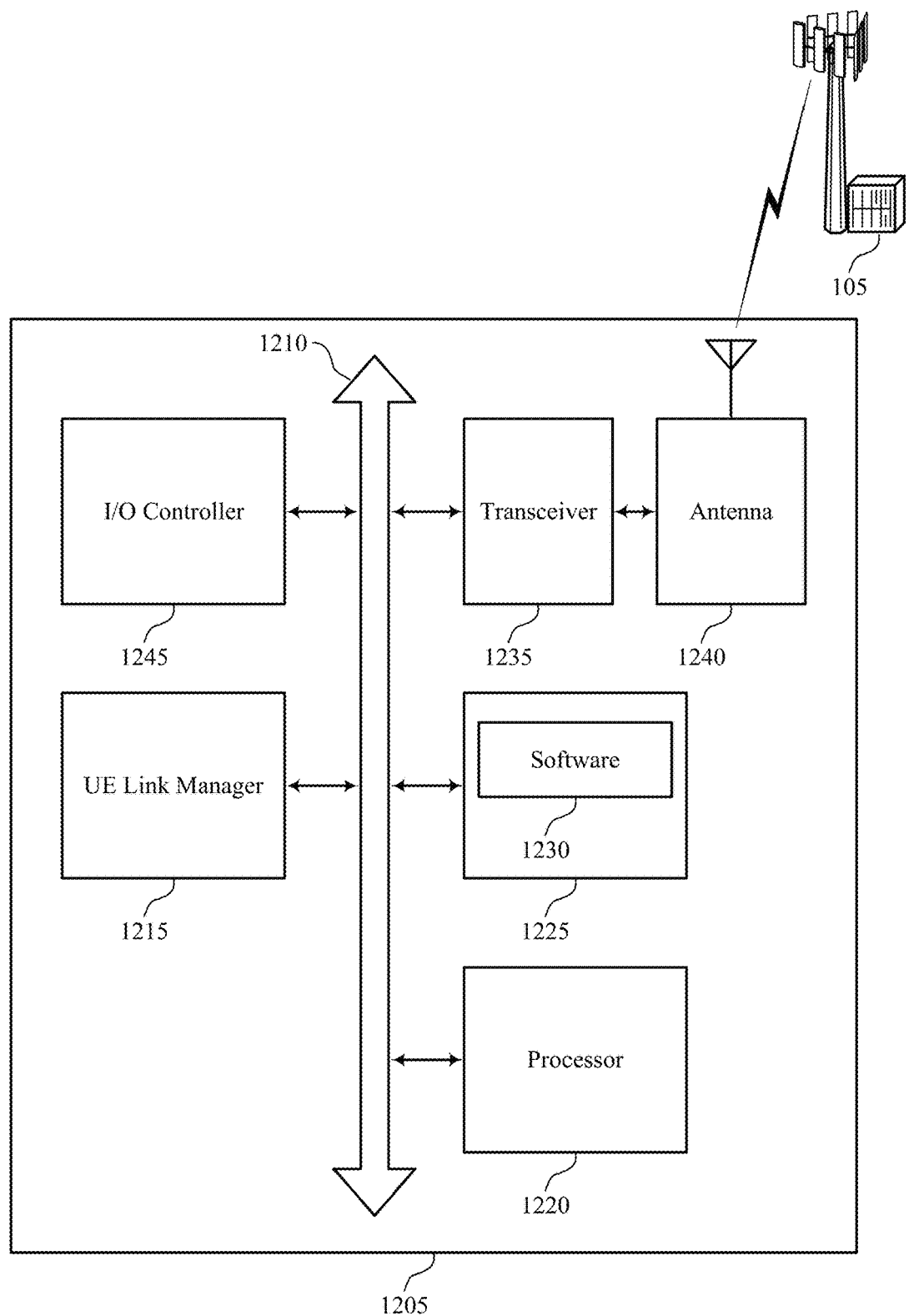
FIG. 12 shows a block diagram of a system including a wireless device that supports uplink beam, downlink beam, and radio link monitoring in accordance with aspects of the present disclosure.

FIG. 12 shows a block diagram of a system 1200 including a wireless device 1205 that supports uplink beam, downlink beam, and radio link monitoring in accordance with aspects of the present disclosure. Wireless device 1205 may be an example of or include the components of UE 115, for example, as described with reference to FIG. 1. Wireless device 1205 may include components for bi-directional voice and data communications including components for transmitting and receiving communications, including UE link manager 1215, processor 1220, memory 1225, software 1230, transceiver 1235, antenna 1240, and I/O controller 1245. These components may be in electronic communication via one or more busses (e.g., bus 1210). Wireless device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting uplink beam, downlink beam, and radio link monitoring).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support uplink beam, downlink beam, and radio link monitoring. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for wireless device 1205. I/O controller 1245 may also manage peripherals not integrated into wireless device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with wireless device 1205 via I/O controller 1245 or via hardware components controlled by I/O controller 1245.

Figure 13:
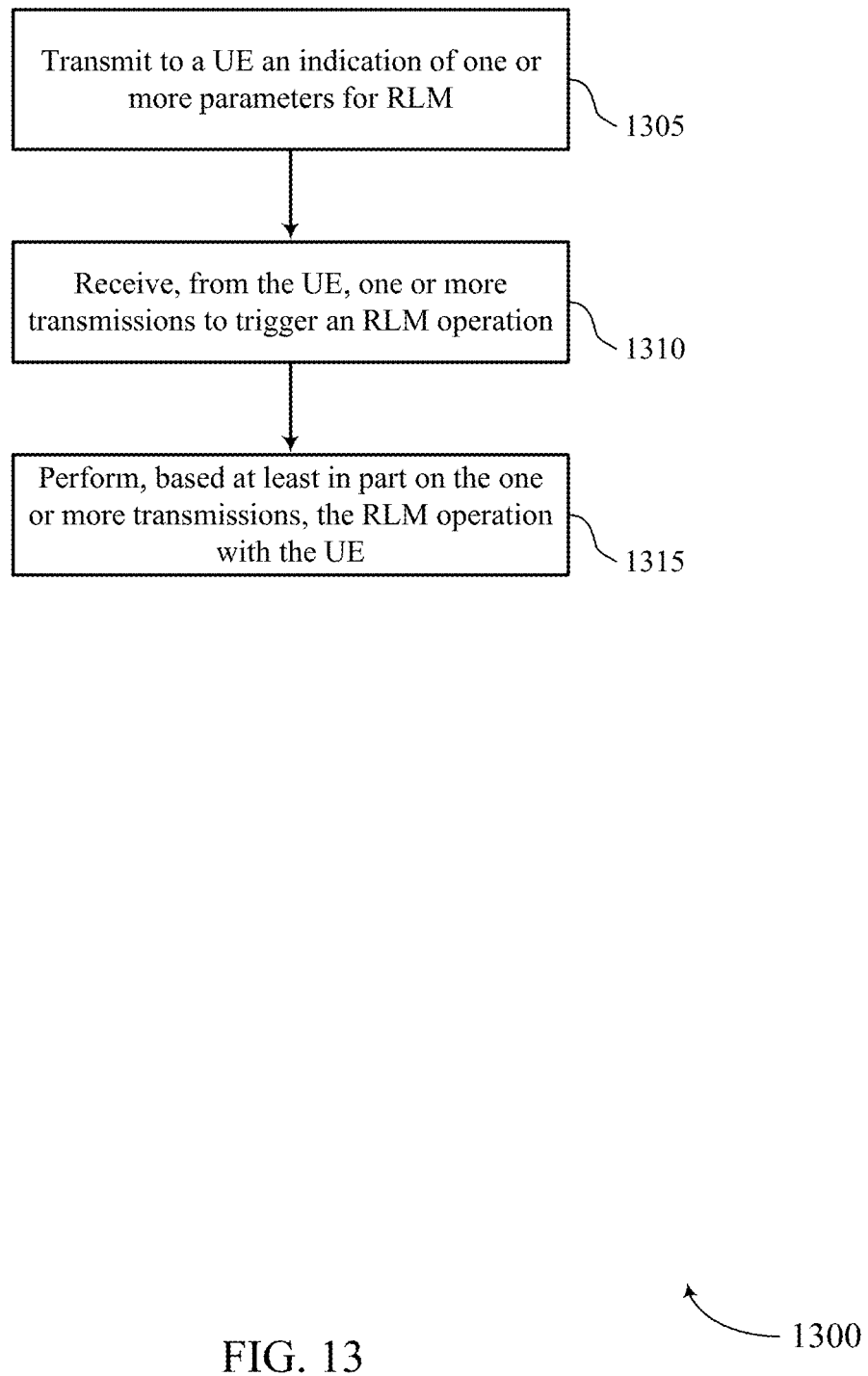
FIGS. 13 through 17 show flowcharts illustrating methods for uplink beam, downlink beam, and radio link monitoring in accordance with aspects of the present disclosure.

FIG. 13 shows a flowchart illustrating a method 1300 for uplink beam, downlink beam, and radio link monitoring in accordance with aspects of the present disclosure. The operations of method 1300 may be implemented by a base station 105 or its components as described herein. For example, the operations of method 1300 may be performed by a base station link manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may transmit to a UE an indication of one or more parameters for RLM. The operations of block 1305 may be performed according to the methods as described with reference to FIGS. 1 through 3. In some examples, aspects of the operations of block 1305 may be performed by a RLM parameter manager as described with reference to FIGS. 5 through 8.

At block 1310 the base station 105 may receive, from the UE, one or more transmissions to trigger an RLM operation. The operations of block 1310 may be performed according to the methods as described with reference to FIGS. 1 through 3. In some examples, aspects of the operations of block 1310 may be performed by a RLM triggering manager as described with reference to FIGS. 5 through 8.

At block 1315 the base station 105 may perform, based at least in part on the one or more transmissions, the RLM operation with the UE. The operations of block 1315 may be performed according to the methods as described with reference to FIGS. 1 through 3. In some examples, aspects of the operations of block 1315 may be performed by a RLM manager as described with reference to FIGS. 5 through 8.

Figure 14:
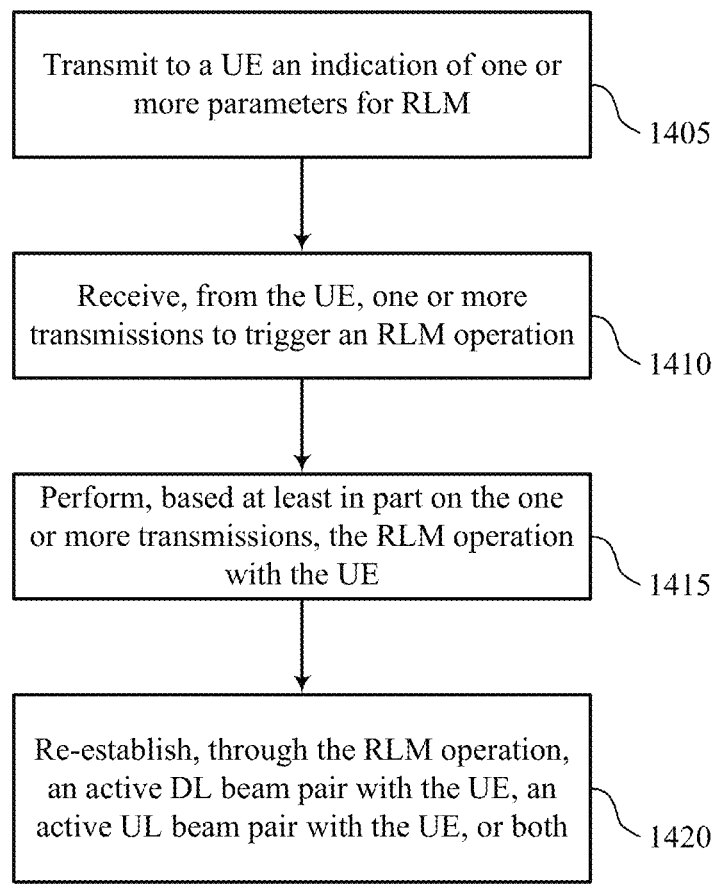

FIG. 14 shows a flowchart illustrating a method 1400 for uplink beam, downlink beam, and radio link monitoring in accordance with aspects of the present disclosure. The operations of method 1400 may be implemented by a base station 105 or its components as described herein. For example, the operations of method 1400 may be performed by a base station link manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may transmit to a UE an indication of one or more parameters for RLM. The operations of block 1405 may be performed according to the methods as described with reference to FIGS. 1 through 3. In some examples, aspects of the operations of block 1405 may be performed by a RLM parameter manager as described with reference to FIGS. 5 through 8.

At block 1410 the base station 105 may receive, from the UE, one or more transmissions to trigger an RLM operation. The operations of block 1410 may be performed according to the methods as described with reference to FIGS. 1 through 3. In some examples, aspects of the operations of block 1410 may be performed by a RLM triggering manager as described with reference to FIGS. 5 through 8.

At block 1415 the base station 105 may perform, based at least in part on the one or more transmissions, the RLM operation with the UE. The operations of block 1415 may be performed according to the methods as described with reference to FIGS. 1 through 3. In some examples, aspects of the operations of block 1415 may be performed by a RLM manager as described with reference to FIGS. 5 through 8.

At block 1420 the base station 105 may re-establish, through the RLM operation, an active downlink beam pair with the UE, an active uplink beam pair with the UE, or both. The operations of block 1420 may be performed according to the methods as described with reference to FIGS. 1 through 3. In some examples, aspects of the operations of block 1420 may be performed by a beam pair manager as described with reference to FIGS. 5 through 8.

Figure 15:
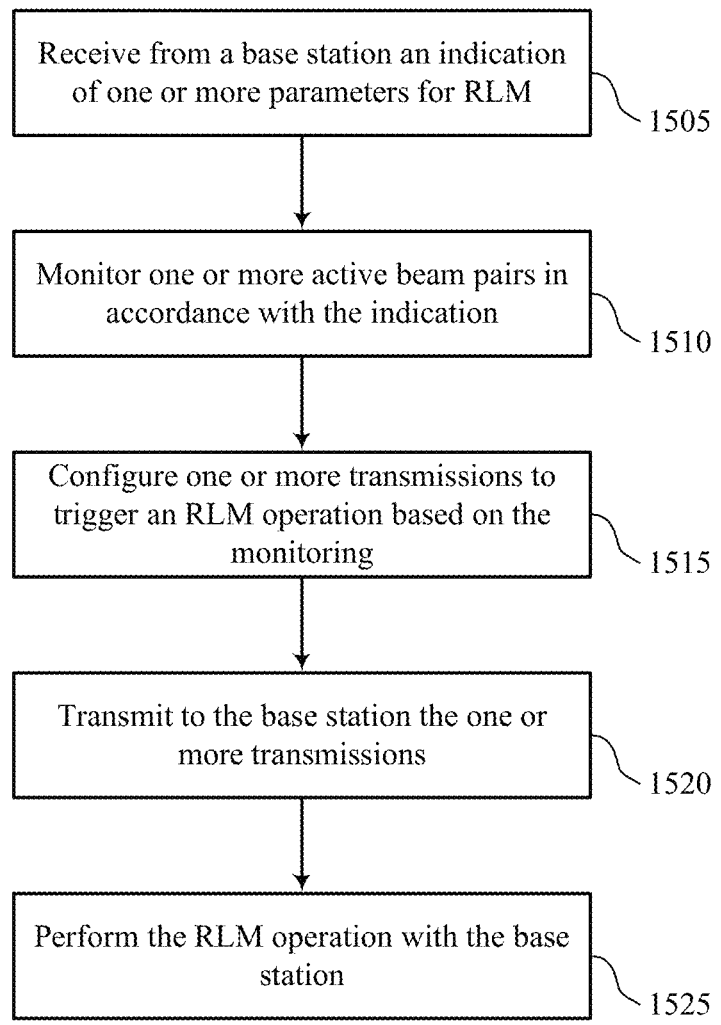

FIG. 15 shows a flowchart illustrating a method 1500 for uplink beam, downlink beam, and radio link monitoring in accordance with aspects of the present disclosure. The operations of method 1500 may be implemented by a UE 115 or its components as described herein. For example, the operations of method 1500 may be performed by a UE link manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive from a base station an indication of one or more parameters for RLM. The operations of block 1505 may be performed according to the methods as described with reference to FIGS. 1 through 3. In some examples, aspects of the operations of block 1505 may be performed by a RLM parameter manager as described with reference to FIGS. 9 through 12.

At block 1510 the UE 115 may monitor one or more active beam pairs in accordance with the indication. The operations of block 1510 may be performed according to the methods as described with reference to FIGS. 1 through 3. In some examples, aspects of the operations of block 1510 may be performed by a beam pair manager as described with reference to FIGS. 9 through 12.

At block 1515 the UE 115 may configure one or more transmissions to trigger an RLM operation based at least in part on the monitoring. The operations of block 1515 may be performed according to the methods as described with reference to FIGS. 1 through 3. In some examples, aspects of the operations of block 1515 may be performed by a RLM triggering manager as described with reference to FIGS. 9 through 12.

At block 1520 the UE 115 may transmit to the base station the one or more transmissions. The operations of block 1520 may be performed according to the methods as described with reference to FIGS. 1 through 3. In some examples, aspects of the operations of block 1520 may be performed by a transmitter as described with reference to FIGS. 9 through 12.

At block 1525 the UE 115 may perform the RLM operation with the base station. The operations of block 1525 may be performed according to the methods as described with reference to FIGS. 1 through 3. In some examples, aspects of the operations of block 1525 may be performed by a RLM manager as described with reference to FIGS. 9 through 12.

Figure 16:
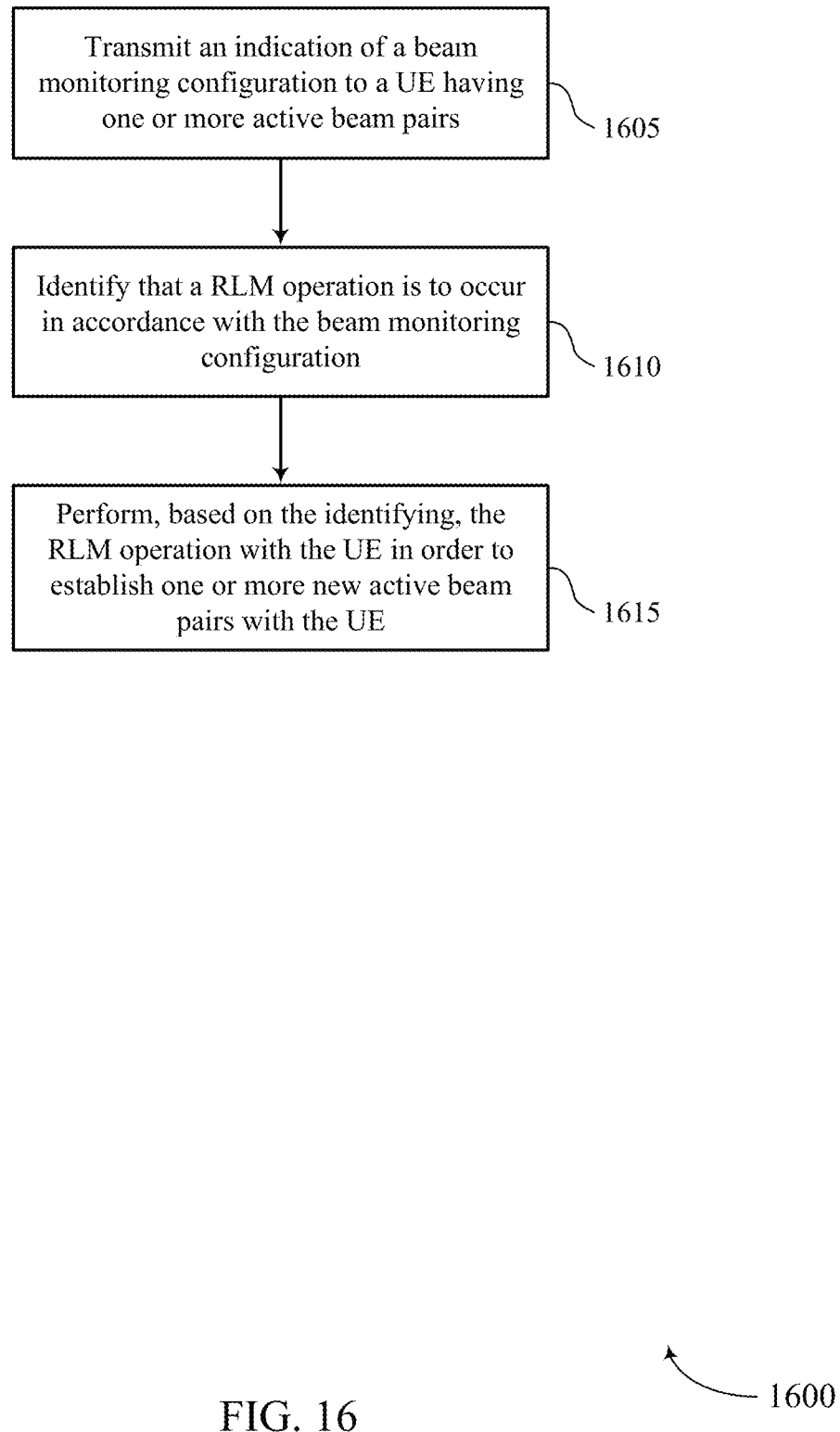

FIG. 16 shows a flowchart illustrating a method 1600 for uplink beam, downlink beam, and radio link monitoring in accordance with aspects of the present disclosure. The operations of method 1600 may be implemented by a base station 105 or its components as described herein. For example, the operations of method 1600 may be performed by a base station link manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may transmit an indication of a beam monitoring configuration to a UE having one or more active beam pairs. In some cases, transmitting an indication of parameters for RLM, for example, as described with reference to FIGS. 13 through 14, may include transmitting the indication of the beam monitoring configuration to the UE having one or more active beam pairs. The operations of block 1605 may be performed according to the methods as described with reference to FIGS. 1 through 3. In some examples, aspects of the operations of block 1605 may be performed by a monitoring configuration manager as described with reference to FIGS. 5 through 8.

At block 1610 the base station 105 may identify that a RLM operation is to occur in accordance with the beam monitoring configuration. The operations of block 1610 may be performed according to the methods as described with reference to FIGS. 1 through 3. In some examples, aspects of the operations of block 1610 may be performed by a RLM manager as described with reference to FIGS. 5 through 8.

At block 1615 the base station 105 may perform, based on the identifying, the RLM operation with the UE in order to establish one or more new active beam pairs with the UE. The operations of block 1615 may be performed according to the methods as described with reference to FIGS. 1 through 3. In some examples, aspects of the operations of block 1615 may be performed by a RLM manager as described with reference to FIGS. 5 through 8.

Figure 17:
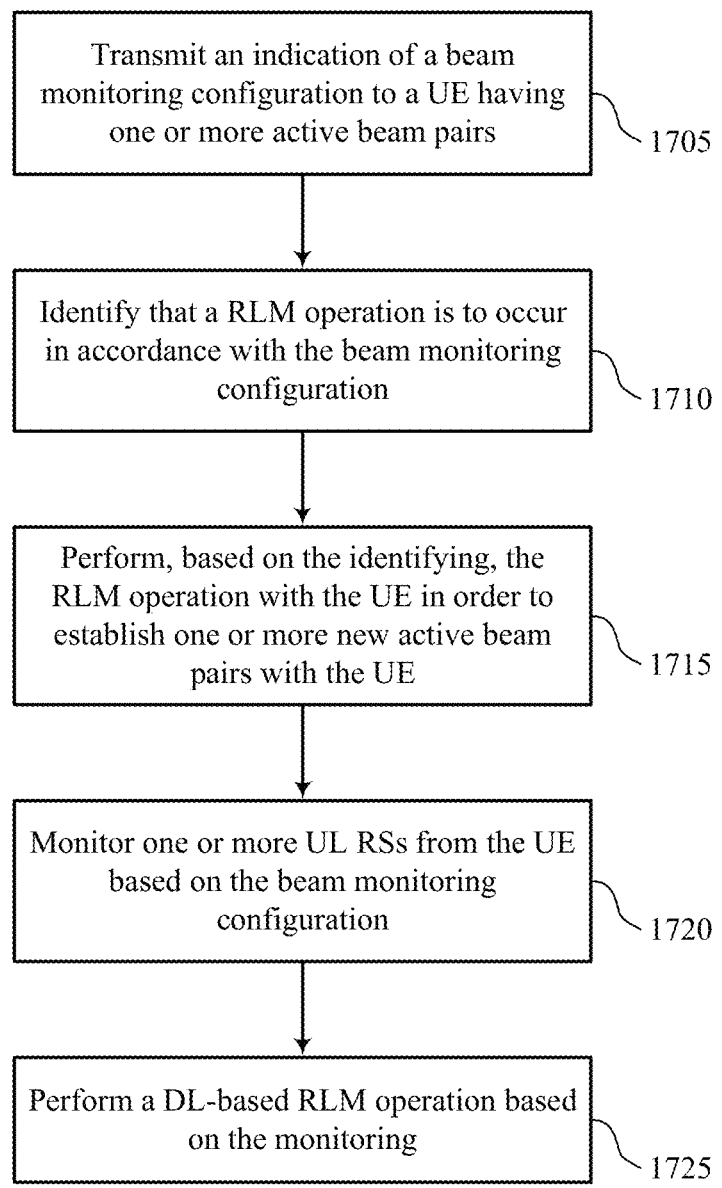

FIG. 17 shows a flowchart illustrating a method 1700 for uplink beam, downlink beam, and radio link monitoring in accordance with aspects of the present disclosure. The operations of method 1700 may be implemented by a base station 105 or its components as described herein. For example, the operations of method 1700 may be performed by a base station link manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may transmit an indication of a beam monitoring configuration to a UE having one or more active beam pairs. In some cases, transmitting an indication of parameters for RLM, for example, as described with reference to FIGS. 13 through 14, may include transmitting the indication of the beam monitoring configuration to the UE having one or more active beam pairs. The operations of block 1705 may be performed according to the methods as described with reference to FIGS. 1 through 3. In some examples, aspects of the operations of block 1705 may be performed by a monitoring configuration manager as described with reference to FIGS. 5 through 8.

At block 1710 the base station 105 may identify that a RLM operation is to occur in accordance with the beam monitoring configuration. The operations of block 1710 may be performed according to the methods as described with reference to FIGS. 1 through 3. In some examples, aspects of the operations of block 1710 may be performed by a RLM manager as described with reference to FIGS. 5 through 8.

At block 1715 the base station 105 may perform, based on the identifying, the RLM operation with the UE in order to establish one or more new active beam pairs with the UE. The operations of block 1715 may be performed according to the methods described with reference to FIGS. 1 through 3. In some examples, aspects of the operations of block 1715 may be performed by a RLM manager as described with reference to FIGS. 5 through 8.

At block 1720 the base station 105 may monitor one or more uplink RSs from the UE based at least in part on the beam monitoring configuration. The operations of block 1720 may be performed according to the methods as described with reference to FIGS. 1 through 3. In some examples, aspects of the operations of block 1720 may be performed by a RS manager as described with reference to FIGS. 5 through 8.

At block 1725 the base station 105 may perform a DL-based RLM operation based at least in part on the monitoring. The operations of block 1725 may be performed according to the methods as described with reference to FIGS. 1 through 3. In some examples, aspects of the operations of block 1725 may be performed by a RLM manager as described with reference to FIGS. 5 through 8.

In some examples, aspects from two or more of the methods may be combined. It should be noted that the described methods are just example implementations, and that the operations of the described methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications system 200 as described with reference to FIGS. 1 and 2—may include one or more carriers, where each carrier may be a signal made up of multiple sub—carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
transmitting, by a wireless device and to a user equipment (UE), an indication of one or more parameters for radio link monitoring (RLM) of one or more active beam pairs of the UE;
receiving, at the wireless device, one or more transmissions from the UE that trigger an RLM operation for monitoring an uplink signal transmitted by the UE;
performing, at the wireless device and based at least in part on the one or more transmissions from the UE, the RLM operation for monitoring the uplink signal transmitted by the UE with the UE for at least one of the one or more active beam pairs; and
configuring the UE or a group of UEs that includes the UE to periodically transmit one or more reference signals (RSs) in a plurality of directions for the RLM operation;
monitoring the one or more RSs;
determining, based at least in part on the monitoring, that the UE is to transmit the one or more RSs in a subset of the plurality of directions for the RLM operation, the subset corresponding to the one or more active beam pairs of the UE; and
receiving the one or more RS s on the subset of the plurality of directions for the RLM operation.

2. The method of claim 1, further comprising:
re-establishing, through the RLM operation, an active downlink (DL) beam pair with the UE, an active uplink (UL) beam pair with the UE, or both.

3. The method of claim 1, wherein:
receiving, at the wireless device, the one or more transmissions from the UE to trigger the RLM operation for monitoring the uplink signal transmitted by the UE comprises: the wireless device receiving, from the UE, one or more reference signals (RSs), wherein the RSs are configured, in accordance with an RLM trigger configuration, to indicate that the RLM operation is for re-establishing an active DL beam pair with the UE.

4. The method of claim 3, wherein the received one or more RSs are synchronization signal (SS) blocks, the SS blocks configured by radio resource control (RRC), or channel state information RSs (CSI-RSs), the CSI-RSs configured by RRC, or a combination thereof.

5. The method of claim 1, wherein:
receiving, at the wireless device the one or more transmissions from the UE to trigger the RLM operation comprises: receiving, from the UE, one or more RSs, wherein the RSs are configured to indicate through use of an RS sequence, an RS cyclic shift, an RS resource, or combinations thereof, that the RLM operation is for re-establishing an active DL beam pair with the UE.

6. The method of claim 1, further comprising:
the wireless device transmitting an indication of a beam monitoring configuration to the UE, wherein the beam monitoring configuration indicates that the RLM operation is able to be triggered to re-establish an active DL beam pair with the UE, an active UL beam pair with the UE, or both.

7. The method of claim 1, further comprising:
exchanging with one or more base stations a RS configuration for the UE indicating a type of RS to be transmitted by the UE or the group of UEs.

8. The method of claim 1, further comprising:
comparing the one or more RSs with a threshold to determine whether to perform the RLM operation.

9. The method of claim 8, further comprising:
the wireless device performing, based at least in part on the comparing, additional DL beam training with the UE.

10. The method of claim 8, further comprising:
requesting, of the UE, additional UL RSs in one or more requested directions.

11. The method of claim 1, further comprising:
identifying that the RLM operation is to occur in accordance with a beam monitoring configuration; and
performing, based at least in part on the identifying, the RLM operation with the UE in order to establish one or more new active beam pairs with the UE, wherein transmitting the indication of the one or more parameters for RLM comprises transmitting an indication of the beam monitoring configuration to the UE.

12. The method of claim 11, wherein:
the beam monitoring configuration indicates one or both of an UL monitoring type or a DL monitoring type.

13. The method of claim 11, further comprising:
performing the RLM operation with the UE based at least in part on a radio link status message in order to establish one or more new UL active beam pairs with the UE.

14. The method of claim 11, wherein:
identifying that the RLM operation is to occur comprises: determining a lack of radio frequency calibration or a DL/UL imbalance.

15. The method of claim 11, further comprising:
transmitting the indication of the beam monitoring configuration to one or more base stations.

16. The method of claim 11, further comprising:
monitoring one or more UL reference signals (RSs) from the UE based at least in part on the beam monitoring configuration;
determining, based at least in part on the monitoring, a set of RS beams for an UL-based RLM operation; and
transmitting an indication to the UE of the set of RS beams to be used for the UL-based RLM operation.

17. The method of claim 11, further comprising:
monitoring one or more UL reference signals (RSs) from the UE based at least in part on the beam monitoring configuration; and
performing a DL-based RLM operation based at least in part on the monitoring.

18. The method of claim 11, further comprising:
monitoring one or more UL reference signals (RSs) from the UE based at least in part on the beam monitoring configuration; and
transmitting a request for one or more additional UL RSs based at least in part on the monitoring.

19. A method for wireless communications, comprising:
receiving, at a user equipment (UE) and from a base station, an indication of one or more parameters for radio link monitoring (RLM) of one or more active beam pairs;
monitoring, at the UE, the one or more active beam pairs in accordance with the indication;
receiving, from the base station, a configuration to periodically transmit one or more reference signals (RSs) for an RLM operation, wherein the configuration indicates that each of the one or more RSs is to be transmitted in a different direction; and
configuring, at the UE, one or more transmissions to trigger the RLM operation at the base station for monitoring an uplink signal transmitted by the UE based at least in part on the monitoring and the configuration received from the base station; and
transmitting, from the UE and to the base station, the one or more transmissions, wherein each of the one or more transmissions comprises a different one of the RSs.

20. The method of claim 19, further comprising:
re-establishing, through the RLM operation, an active downlink (DL) beam pair with the base station, an active uplink (UL) beam pair with the base station, or both.

21. The method of claim 19, wherein:
transmitting the one or more transmissions comprises:
transmitting, to the base station, the one or more RSs, wherein the one or more RSs are configured, in accordance with an RLM trigger configuration, to indicate that the RLM operation is for re-establishing an active DL beam pair with the base station.

22. The method of claim 21, wherein the transmitted one or more RSs are synchronization signal (SS) blocks, the SS blocks configured by radio resource control (RRC), or channel state information RSs (CSI-RSs), the CSI-RSs configured by radio resource control (RRC), or a combination thereof.

23. The method of claim 19, wherein:
transmitting the one or more transmissions comprises:
transmitting, to the base station, one or more RSs, wherein the RSs are configured to indicate through use of an RS sequence, an RS cyclic shift, an RS resource, or combinations thereof, that the RLM operation is for re-establishing an active DL beam pair with the base station.

24. The method of claim 19, further comprising:
receiving an indication of a beam monitoring configuration from the base station, wherein the beam monitoring configuration indicates that the RLM operation is able to be triggered to re-establish an active DL beam pair with the base station, an active UL beam pair with the base station, or both.

25. The method of claim 19, further comprising:
receiving, from the base station, a request for additional UL RSs in one or more requested directions.

26. An apparatus for wireless communications, in a system comprising:
a processor;
memory coupled with the processor; and
instructions stored in the memory and executable by the processor to cause the apparatus to:
transmit, by a wireless device and to a user equipment (UE), an indication of one or more parameters for radio link monitoring (RLM) of one or more active beam pairs;
receive, at the wireless device, one or more transmissions from the UE to trigger an RLM operation for monitoring an uplink signal transmitted by the UE; and
perform, at the wireless device and based at least in part on the one or more transmissions, the RLM operation for monitoring the uplink signal transmitted by the UE with the UE for at least one of the one or more active beam pairs;
configure the UE or a group of UEs that includes the UE to periodically transmit one or more reference signals (RSs) in a plurality of directions for the RLM operation;
monitor the one or more RSs;
determine, based at least in part on the monitoring, that the UE is to transmit the one or more RSs in a subset of directions for the RLM operation, the subset corresponding to the one or more active beam pairs of the UE; and
receive the one or more RSs on the subset of the plurality of directions for the RLM operation.

27. An apparatus for wireless communications, in a system comprising:
a processor;
memory coupled with the processor; and
instructions stored in the memory and executable by the processor to cause the apparatus to:
receive, at a user equipment (UE) and from a base station, an indication of one or more parameters for radio link monitoring (RLM) of one or more active beam pairs;
monitor, at the UE, the one or more active beam pairs in accordance with the indication;
receive, from the base station, a configuration to periodically transmit one or more reference signals (RSs) for an RLM operation, wherein the configuration indicates that each of the one or more RS s is to be transmitted in a different direction; and
configure, at the UE, one or more transmissions to trigger the RLM operation at the base station for monitoring an uplink signal transmitted by the UE based at least in part on the monitoring and the configuration received from the base station; and
transmit, from the UE and to the base station, the one or more transmissions,
wherein each of the one or more transmissions comprises a different one of the RSs.

28. The method of claim 1, further comprising:
transmitting an indication of a beam monitoring configuration to the UE, wherein the beam monitoring configuration indicates a type of the RLM operation to be performed.

29. The apparatus of claim 26, wherein the instructions stored in the memory are executable by the processor to cause the apparatus to re-establish, through the RLM operation, an active downlink (DL) beam pair with the UE, an active uplink (UL) beam pair with the UE, or both.

30. The apparatus of claim 26, wherein the RSs are configured to indicate through use of an RS sequence, an RS cyclic shift, an RS resource, or combinations thereof, that the RLM operation is for re-establishing an active DL beam pair with the UE.

31. The apparatus of claim 27, wherein the instructions stored in the memory are executable by the processer to cause the apparatus to re-establish, through the RLM operation, an active downlink (DL) beam pair with the base station, an active uplink (UL) beam pair with the base station, or both.

32. The apparatus of claim 27, wherein the RSs are configured to indicate through use of an RS sequence, an RS cyclic shift, an RS resource, or combinations thereof, that the RLM operation is for re-establishing an active DL beam pair with the UE.

* * * * *